United States Patent
Kobayashi et al.

(10) Patent No.: US 9,207,848 B2
(45) Date of Patent: Dec. 8, 2015

(54) TEXT DISPLAY DEVICE, TEXT DISPLAY PROGRAM, AND TEXT DISPLAY METHOD PRESENTING TACTILE SENSATIONS IN ACCORDANCE WITH DISPLAYED TEXT

(75) Inventors: Kouji Kobayashi, Osaka (JP); Shohji Ohtsubo, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 115 days.

(21) Appl. No.: 13/498,363

(22) PCT Filed: Nov. 25, 2010

(86) PCT No.: PCT/JP2010/006883
§ 371 (c)(1),
(2), (4) Date: Mar. 27, 2012

(87) PCT Pub. No.: WO2011/080872
PCT Pub. Date: Jul. 7, 2011

(65) Prior Publication Data
US 2012/0182248 A1 Jul. 19, 2012

(30) Foreign Application Priority Data
Dec. 28, 2009 (JP) .................................. 2009-298844

(51) Int. Cl.
*G06F 3/041* (2006.01)
*G06F 3/0485* (2013.01)
(Continued)

(52) U.S. Cl.
CPC .............. *G06F 3/0485* (2013.01); *G06F 1/169* (2013.01); *G06F 3/016* (2013.01); *G06F 3/038* (2013.01); *G06F 3/03547* (2013.01); *G06F 3/0488* (2013.01); *G06F 17/2735* (2013.01)

(58) Field of Classification Search
CPC ..... G06F 1/169; G06F 17/2735; G06F 3/016; G06F 3/03547; G06F 3/038; G06F 3/0485; G06F 3/0488

USPC .............................. 340/407.1; 345/173–178; 178/18.01–18.09
See application file for complete search history.

(56) References Cited

U.S. PATENT DOCUMENTS 6,747,631 B1 * 6/2004 Sakamaki et al. ............. 345/157
8,362,882 B2 * 1/2013 Heubel et al. ............... 340/407.1
(Continued)

FOREIGN PATENT DOCUMENTS

JP 2000-148393 5/2000
JP 2002-268791 9/2002
(Continued)

OTHER PUBLICATIONS

International Search Report issued Mar. 1, 2011 in corresponding International Application No. PCT/JP2010/006883.
(Continued)

*Primary Examiner* — Amare Mengistu
*Assistant Examiner* — Stacy Khoo
(74) *Attorney, Agent, or Firm* — Wenderoth, Lind & Ponack, L.L.P.

(57) ABSTRACT

The text display device includes: a display control section that displays, on a display device, a text containing a predetermined feature position; an input section that receives an operation performed by a finger of the operator on an input device, and detects a presence of a contact with the finger and XY-coordinates corresponding to a finger position; a calculation section that, when a contact with the finger is detected, associates the detected XY-coordinates with an emphasis display position in the displayed text, calculates a relative distance between the emphasis display position and the feature position, and calculates coordinate values corresponding to the feature position based on the relative distance and the detected XY-coordinates; and a tactile sensation presentation section that provides the operator with a tactile sensation of a protrusion or a depression at a position in the input area indicated by the calculated coordinate values.

13 Claims, 17 Drawing Sheets

(51) Int. Cl.
*G06F 1/16* (2006.01)
*G06F 3/01* (2006.01)
*G06F 3/0354* (2013.01)
*G06F 3/038* (2013.01)
*G06F 3/0488* (2013.01)
*G06F 17/27* (2006.01)

(56) References Cited

U.S. PATENT DOCUMENTS

| | | |
|---|---|---|
| 2002/0105496 A1 | 8/2002 | Giuliani et al. |
| 2004/0070571 A1* | 4/2004 | Woodard et al. ............... 345/173 |
| 2004/0100451 A1* | 5/2004 | Okada ........................... 345/173 |
| 2008/0007532 A1* | 1/2008 | Chen ............................. 345/173 |
| 2008/0060856 A1* | 3/2008 | Shahoian et al. ........... 178/18.03 |
| 2008/0068343 A1* | 3/2008 | Hoshino et al. ............... 345/173 |
| 2009/0066672 A1 | 3/2009 | Tanabe et al. |
| 2010/0107046 A1* | 4/2010 | Kang et al. .................... 715/207 |

FOREIGN PATENT DOCUMENTS

| | | |
|---|---|---|
| JP | 2006-195734 | 7/2006 |
| JP | 2009-64357 | 3/2009 |

OTHER PUBLICATIONS

Yasushi Ikei et al., "Vibratory Tactile Display of Image-Based Textures", Tokyo Metropolitan Institute of Technology, IEEE Computer Graphics and Applications, vol. 17, No. 6, Nov.-Dec. 1997, pp. 53-61.

* cited by examiner

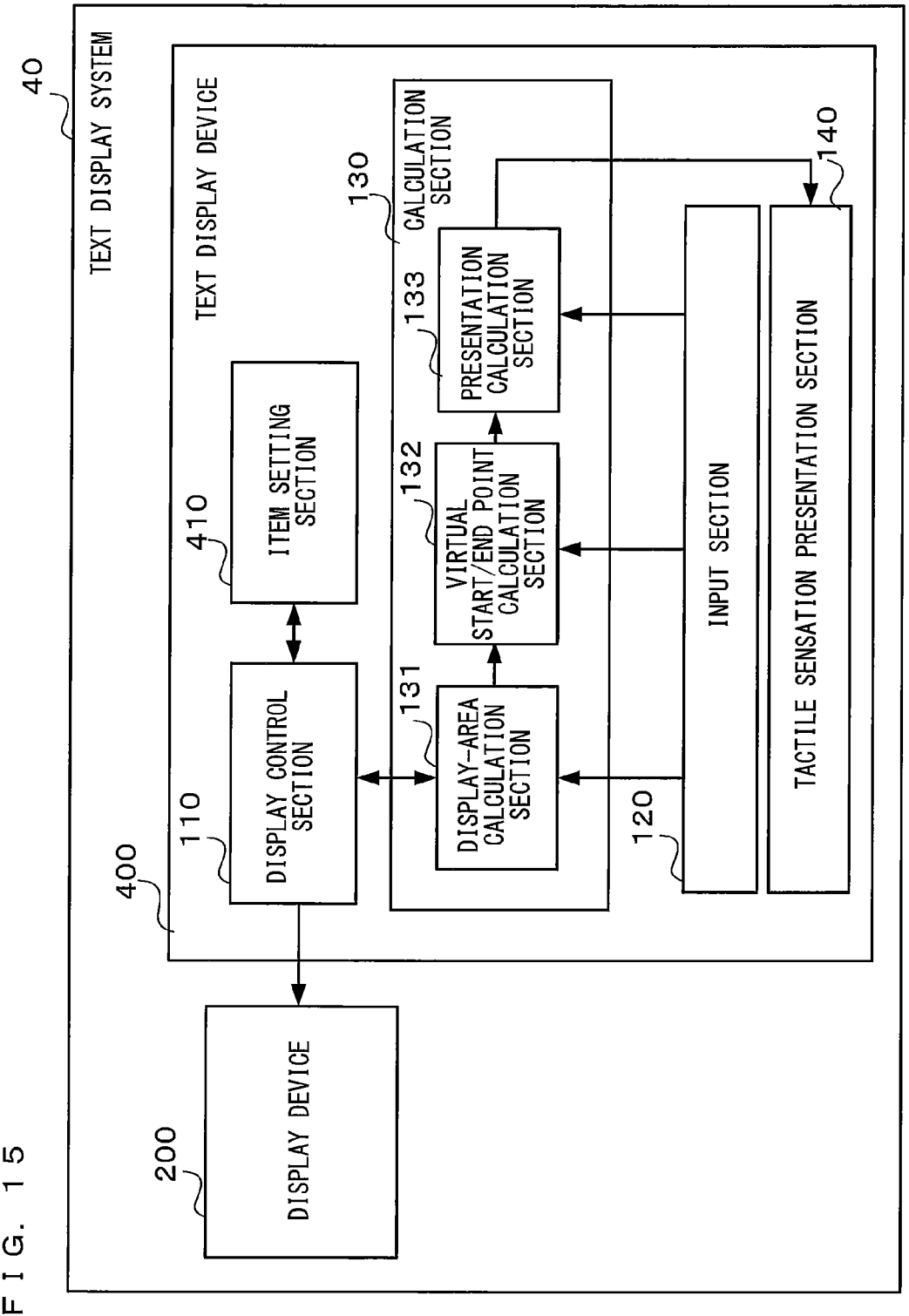

FIG. 16

```
SETTINGS FOR TACTILE SENSATION PRESENTATION

☑ STARTING POSITION      ☑ FORM A           ☑ SOLID     HEIGHT (DEPTH)
   OF TEXT                  PROTRUSION         LINE
                         ☐ FORM A           ☐ DOTTED    5.0  mm
                            DEPRESSION         LINE

☑ ENDING POSITION        ☑ FORM A           ☑ SOLID     HEIGHT (DEPTH)
   OF TEXT                  PROTRUSION         LINE
                         ☐ FORM A           ☐ DOTTED    5.0  mm
                            DEPRESSION         LINE

☑ STARTING POSITION      ☑ FORM A           ☑ SOLID     HEIGHT (DEPTH)
   OF PARAGRAPH             PROTRUSION         LINE
                         ☐ FORM A           ☐ DOTTED    4.0  mm
                            DEPRESSION         LINE

☑ ENDING POSITION        ☑ FORM A           ☑ SOLID     HEIGHT (DEPTH)
   OF PARAGRAPH             PROTRUSION         LINE
                         ☐ FORM A           ☐ DOTTED    4.0  mm
                            DEPRESSION         LINE

☑ BOOKMARK POSITION      ☑ FORM A           ☐ SOLID     HEIGHT (DEPTH)
                            PROTRUSION         LINE
                         ☐ FORM A           ☑ DOTTED    2.5  mm
                            DEPRESSION         LINE

☐ DICTIONARY INDEX       MAXIMUM NUMBER OF HEADING WORDS TO BE
                         PRESENTED AS TACTILE SENSATIONS AT ONCE
                                         10   WORDS
```

FIG. 17

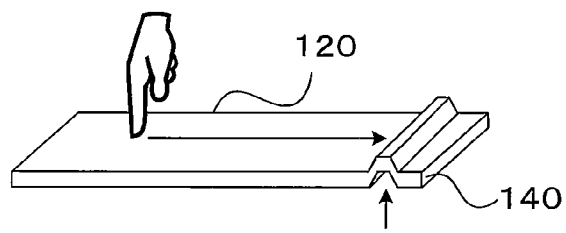

TEXT DISPLAY DEVICE, TEXT DISPLAY PROGRAM, AND TEXT DISPLAY METHOD PRESENTING TACTILE SENSATIONS IN ACCORDANCE WITH DISPLAYED TEXT

TECHNICAL FIELD

The present invention relates to a text display device for displaying text on a monitor or the like based on text data, and more specifically, relates to a technology for presenting, to an operator, a tactile sensation in accordance with contents and structure of a displayed text.

BACKGROUND ART

A method commonly used by an operator for performing screen operations, input operations, or the like, is to operate a keyboard and a pointing device such as a touch panel, a mouse, or the like while looking at an image displayed on a monitor or the like.

Although the operator obtains information necessary for the operation mainly through visual sensation in the manner described above, there are also devices that output information utilizing other senses among the five senses.

For example, there is a device that gives out warnings by sounding beeping sounds when inappropriate operations such as an erroneous operation or the like have been performed.

In addition, for example, there is a device that outputs Braille points for visually impaired personals.

Furthermore, Patent Literature 1 discloses an input-output device with a tactile sensation function, in which a panel surface is vibrated by a piezoelectric actuator in response to an input operation performed on a touch panel.

CITATION LIST

Patent Literature

[PTL 1] Japanese Laid-Open Patent Publication No. 2006-195734

SUMMARY OF THE INVENTION

Problems to be Solved by the Invention

The tactile sensation caused by vibration as disclosed in Patent Literature 1 may be suitable when applied for prompting caution to an operator in a case where an error has occurred, or when applied for presenting a single main function such as an incoming call for a mobile phone. However, for example, when the tactile sensation caused by vibration is applied for presenting, to an operator, an occurrence of some sort of an event that had not been defined in advance, the operator cannot sensuously recognize what type of event has generated the vibration. For example, when the tactile sensation caused by vibration as disclosed in the above described Patent Literature 1 is applied as vibration at a start point and an end point of a text or a paragraph of a text displayed on a monitor, unless relying on the visual sensation, the operator will have no clue whether the event that generated the vibration is a start point or an end point, or whether other events such as an error or the like generated the vibration.

In addition, in the above described Patent Literature 1, when a short paragraph is displayed on the monitor and a scroll operation is performed, since a start point and an end point of the paragraph are located close to each other for the scroll operation, the operator will have difficulty in understanding whether the event that generated the vibration is the start point or the end point of the paragraph.

Therefore, the above described Patent Literature 1 cannot become an easy-to-use device that can be operated without reading a manual.

Furthermore, in the above described Patent Literature 1, since it is not possible to specify a position only with the tactile sensation caused by vibration, when a vibration is sensed, the operator looks at a currently displayed screen of the monitor to specify the position, and then performs the next operation. Thus, with the above described Patent Literature 1, it is troublesome and considerably time-consuming for the operator since the operator has to sequentially use both senses of the tactile sensation and the visual sensation until the position is identified.

Thus, the above described Patent Literature 1 does not assist the operator in performing rapid operations.

Therefore, an objective of the present invention is to provide a text display device, a text display program, and a text display method, which allow an operator to sensuously recognize a position in a text with a usage of tactile sensation without relying on visual sensation, and which assist the operator in performing rapid operations, by displaying a text on a monitor or the like, and presenting an output with a tactile sensation in accordance with contents or structure of the displayed text such that the output is sensuously recognizable by the operator.

Solution to the Problems

The present invention is directed toward a text display device, a text display program, and a text display method. In order to solve the above described problem, the text display device of the present invention is a text display device for displaying a text on a display device and receiving an operation performed by an operator, and the text display device includes a display control section, an input section, a calculation section, and a tactile sensation presentation section. The display control section displays, on the display device, a text containing a predetermined feature position. The input section receives an operation performed by a finger of the operator on an input device having a two dimensional input area, and detects a presence of a contact with the finger and a pair of XY-coordinates corresponding to a finger position at which the finger is in contact. When a contact with the finger is detected by the input section, the calculation section associates the pair of XY-coordinates detected by the input section with an emphasis display position in the text displayed by the display control section, calculates a relative distance between the emphasis display position and the feature position, and calculates a pair of coordinate values corresponding to the feature position in the input area based on the relative distance and the pair of XY-coordinates detected by the input section. The tactile sensation presentation section provides the operator with a tactile sensation of a protrusion or a depression at a position in the input area indicated by the pair of coordinate values calculated by the calculation section.

Preferably, the tactile sensation presentation section forms a protrusion or a depression at a position in the input area indicated by the pair of coordinate values calculated by the calculation section.

Preferably, the tactile sensation presentation section causes a simulated protrusion or depression using vibration at a position in the input area indicated by the pair of coordinate values calculated by the calculation section.

Preferably, the calculation section detects an operation of moving the finger position while the finger is still in contact, based on a detection result from the input section, and calculates a movement amount of the emphasis display position in the displayed text in accordance with variation of the pair of XY-coordinates due to the movement; and the display control section moves the emphasis display position in accordance with a calculation result from the calculation section, and, when the input section detects that the finger position has moved to the position at which the tactile sensation of a protrusion or a depression has been provided to the operator by the tactile sensation presentation section, moves the emphasis display position to the feature position.

Preferably, when the input section detects that the finger has been removed, the tactile sensation presentation section further restores, to an original state, the position at which the tactile sensation of a protrusion or a depression has been provided to the operator.

Preferably, the feature position corresponds to an ending position of the text displayed by the display control section or an ending position of a paragraph in the text; the calculation section calculates a Y-coordinate corresponding to the ending position in the input area; and the tactile sensation presentation section provides the operator with a tactile sensation of a protrusion or a depression having a long shape in an X-axis direction, at a position in the input area indicated by the Y-coordinate calculated by the calculation section.

Preferably, the feature position corresponds to an ending position and an ending position of the text displayed by the display control section or each paragraph in the text; the calculation section calculates respective Y-coordinates corresponding to the starting position and the ending position in the input area; and the tactile sensation presentation section provides the operator with a tactile sensation of a protrusion or a depression having a long shape in an X-axis direction, at positions which are in the input area and which are indicated by the respective Y-coordinates calculated by the calculation section.

Preferably, the text display device further includes a bookmark management section that stores and changes a bookmark position indicating a boundary between a portion previously read by the operator and a portion unread by the operator in the text displayed by the display control section, wherein: the feature position corresponds to the bookmark position; the calculation section calculates a Y-coordinate corresponding to the bookmark position in the input area; and the tactile sensation presentation section provides the operator with a tactile sensation of a protrusion or a depression having a long shape in an X-axis direction, at a position in the input area indicated by the Y-coordinate calculated by the calculation section.

Preferably, the display control section displays, on the display device, a dictionary containing predetermined multiple heading positions as the feature position; the calculation section calculates multiple pairs of XY-coordinates corresponding to the respective multiple heading positions in the input area; and the tactile sensation presentation section provides the operator with tactile sensations of protrusions or depressions at respective positions and peripheries thereof which are in the input area and which are indicated by the multiple pairs of XY-coordinates calculated by the calculation section.

Preferably, the tactile sensation presentation section creates a stair-shaped dictionary index by forming protrusions or depressions in the input area based on the multiple pairs of XY-coordinates calculated by the calculation section.

Preferably, the text display device further includes a setting section that allows the operator to arbitrarily set the number of stairs for creating the dictionary index by the tactile sensation presentation section.

In order to solve the above described problem, a text display program of the present invention is a program executed in a text display device for displaying a text on a display device and receiving an operation performed by an operator, and the text display program causes the text display device to execute a display control step, an input step, a calculation step, and a tactile sensation presentation step. The display control step is a step of displaying, on the display device, a text containing a predetermined feature position. The input step is a step of receiving an operation performed by a finger of the operator on an input device having a two dimensional input area, and detecting a presence of a contact with the finger and a pair of XY-coordinates corresponding to a finger position at which the finger is in contact. The calculation step is a step of, when a contact with the finger is detected at the input step, associating the pair of XY-coordinates detected at the input step with an emphasis display position in the text displayed at the display control step, calculating a relative distance between the emphasis display position and the feature position, and calculating a pair of coordinate values corresponding to the feature position in the input area of the input device based on the relative distance and the pair of XY-coordinates detected at the input step. The tactile sensation presentation step is a step of providing the operator with a tactile sensation of a protrusion or a depression at a position in the input area of the input device indicated by the pair of coordinate values calculated at the calculation step.

Furthermore, in order to solve the above described problem, a text display method of the present invention is a method for displaying a text on a display device and receiving an operation performed by an operator, and the method includes a display control step, an input step, a calculation step, and a tactile sensation presentation step. The display control step is a step of displaying, on the display device, a text containing a predetermined feature position. The input step is a step of receiving an operation performed by a finger of the operator on an input device having a two dimensional input area, and detecting a presence of a contact with the finger and a pair of XY-coordinates corresponding to a finger position at which the finger is in contact. The calculation step is a step of, when a contact with the finger is detected at the input step, associating the pair of XY-coordinates detected at the input step with an emphasis display position in the text displayed at the display control step, calculating a relative distance between the emphasis display position and the feature position, and calculating a pair of coordinate values corresponding to the feature position of the input device based on the relative distance and the pair of XY-coordinates detected at the input step. The tactile sensation presentation step is a step of providing the operator with a tactile sensation of a protrusion or a depression at a position in the input area of the input device indicated by the pair of coordinate values calculated at the calculation step.

Advantageous Effects of the Invention

As described above, with the present invention, a finger position at which a finger is in contact with an input section is used as a reference, and a protrusion or a depression can be formed on a position that is on the input section and that corresponds to a feature position such as a dictionary index (heading), a bookmark position, a start point and an end point of a displayed text or a paragraph in the text, and the like. With such configuration, when performing an operation on the displayed text with the input section, an operator can sensuously recognize reaching a feature position upon sensing a protrusion or a depression by his/her own finger. Therefore, since the operator can perform the next operation without looking at a display screen on a monitor, the present invention can assist the operator in performing rapid operations.

BRIEF DESCRIPTION OF THE DRAWINGS

FIG. 15 shows a general outline of a functional configuration of a text display system 40 according to a third modification of the present invention.

FIG. 16 shows a settings screen displayed on a display device 200.

FIG. 17 shows a manner in which a tactile sensation is presented when a finger is moved in a lateral direction to horizontally scroll a screen.

DESCRIPTION OF EMBODIMENTS

First Embodiment

<General Outline>

A first embodiment is to be employed in a situation where an operator performs, while looking at a text displayed on a monitor or the like of a personal computer, an input operation using a pointing device having a two dimensional input area, such as a touchpad or a touch panel. With the first embodiment, one part of the input area of the pointing device is protruded or depressed such that a specific position in the displayed text is sensuously presented to the operator by providing the operator with a tactile sensation of a protrusion or a depression at the specific position in the displayed text. More specifically, for example, by forming a linear protrusion at a part corresponding to ending positions of respective paragraphs or the like in the text, the operator can sensuously recognize that a paragraph or the like continues until a finger hits a protruded part. Furthermore, when the finger hits a protruded part, the operator can sensuously recognize such part as an ending position of a paragraph or the like. Furthermore, since the operator only has to move his/her finger to the protruded part in one stroke in order to move a cursor or the like to an ending position of the paragraph or the like, the operator can perform the next operation without confirming a display such as the monitor, and thereby can perform rapid operations.

<Configuration>

Figure 1:
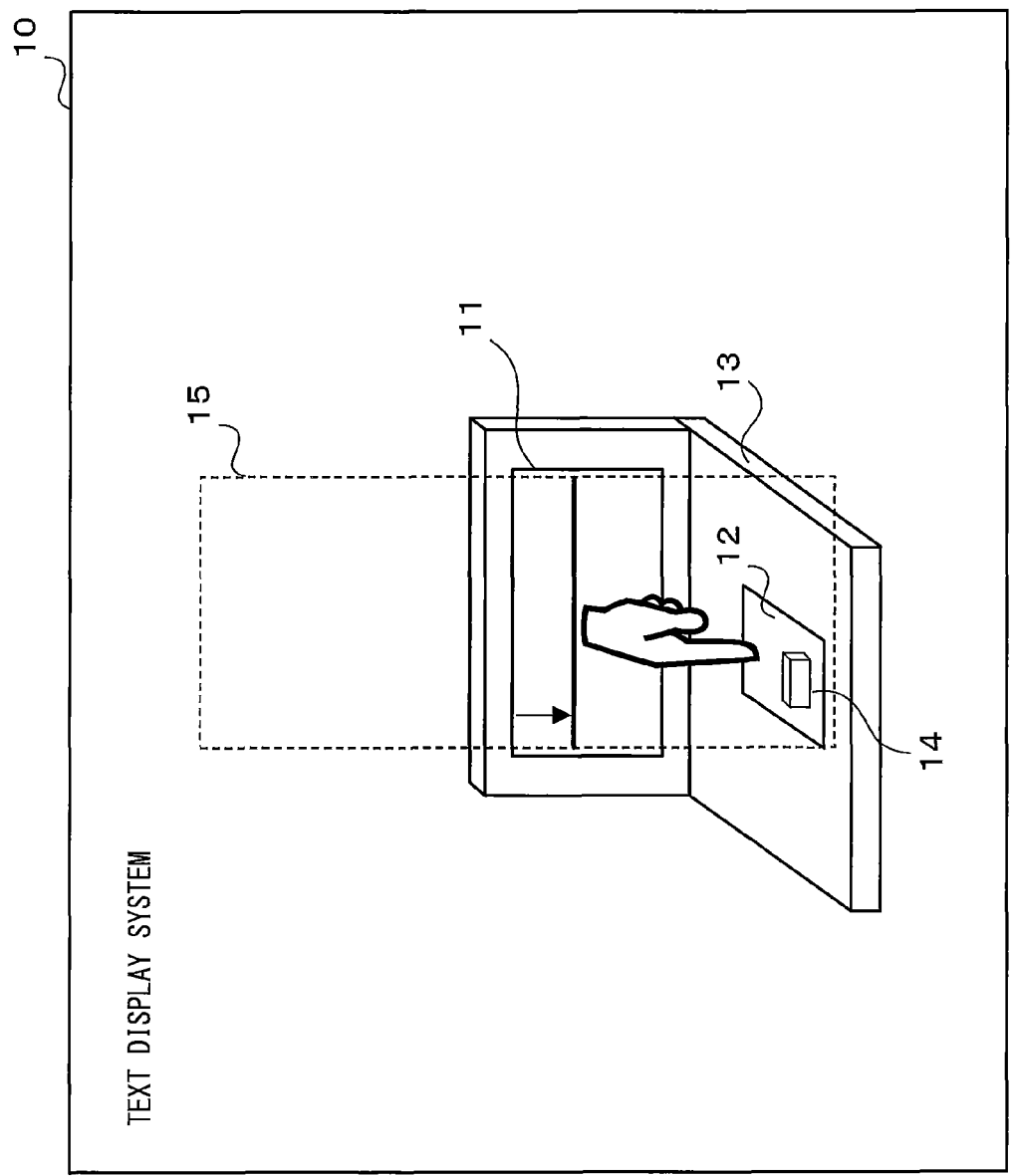
FIG. 1 shows a general view of a text display system 10 of the present invention.

FIG. 1 indicates a general view of a text display system 10 of the present invention.

As shown in FIG. 1, the text display system 10 has a shape and function similar to those of a notebook personal computer, and includes a monitor 11 for displaying a text, a touchpad 12 for receiving an input operation, a personal computer body 13 that contains a calculation circuit, a storage circuit, and the like, and a tactile sensation presentation device 14 that is newly added with the present application. Here, one part of a text is displayed on the monitor 11, and an arrow on the monitor 11 shows an emphasis display position associated to a finger position. The emphasis display position includes: a position indicating a line that can be subjected to an operation and that is highlighted with a reverse video display, an underline, or the like indicating an active line; a position of a mouse pointer indicating a point that can be subjected to an operation; and the like. A rectangular frame 15 shown by a dotted line in the figure represents an image of a single paragraph in the text displayed on the monitor 11.

The tactile sensation presentation device 14 protrudes or depresses one part of the input area of the touchpad 12 from/toward a rear surface thereof. Shown in FIG. 1 is a protrusion at a part of the input area corresponding to an ending position of the paragraph displayed on the monitor 11.

It should be noted that, since the text display system 10 here is based on a shape of a conventional notebook personal computer, the monitor 11, the touchpad 12, the personal computer body 13, and the tactile sensation presentation device 14 are integrally formed; however, instead of being formed integrally, these elements may be separated from each other. For example, if a shape of a desktop personal computer is used as a basis, the monitor 11 will be a device (display device) that is separated and independent from other components. Furthermore, the touchpad 12 and the tactile sensation presentation device 14 may also be devices that are separated from the other components. When the monitor 11, the touchpad 12, and the tactile sensation presentation device 14 are separate devices, they are connected to communication ports (not shown) of the personal computer body 13 as external devices, and the whole acts in coordination.

Furthermore, a touch panel may be used instead of the touchpad 12.

Figure 2:
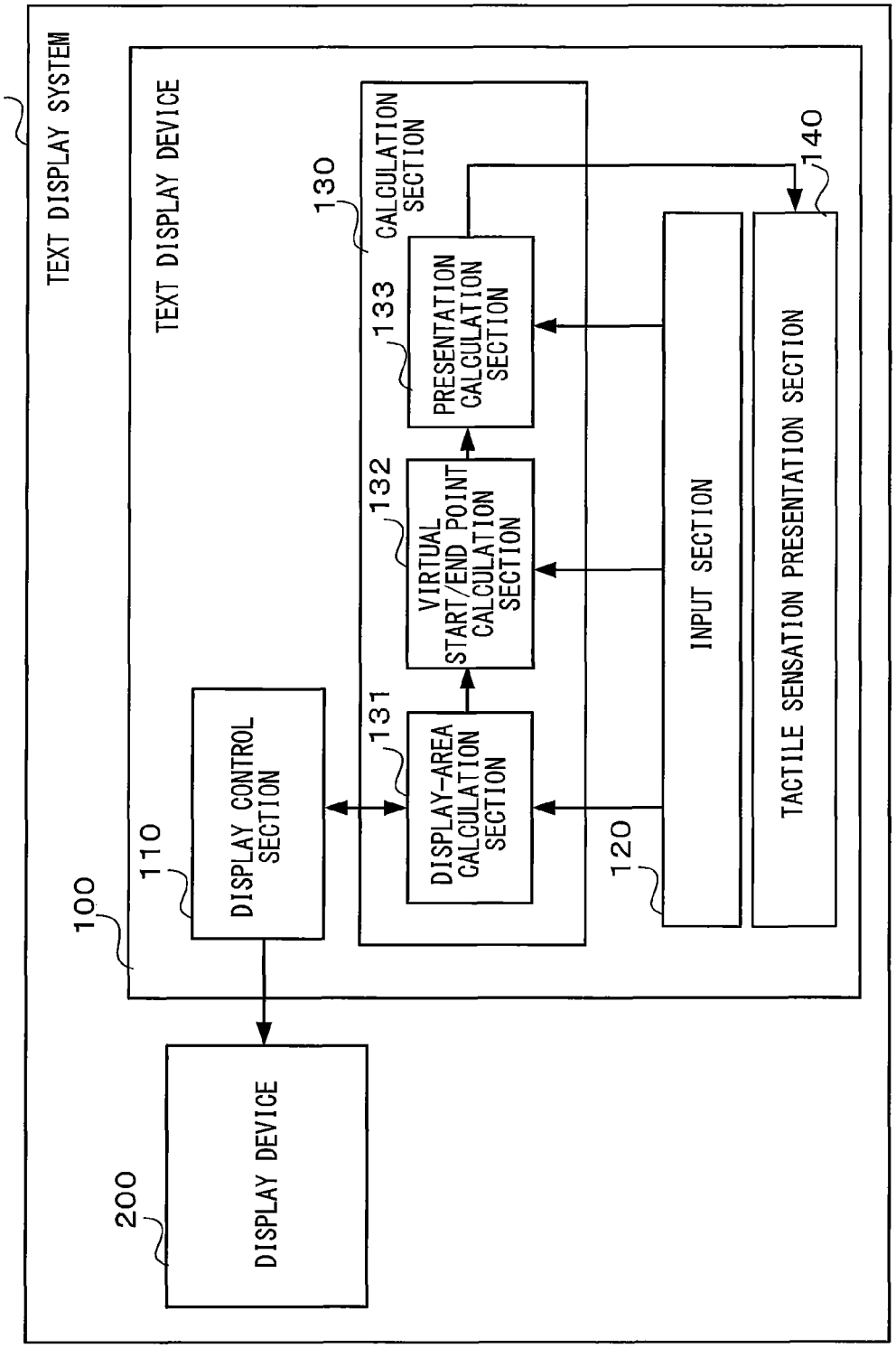
FIG. 2 shows a general outline of a functional configuration of a text display system 20 of the present invention.

FIG. 2 shows a general outline of a functional configuration of a text display system 20 of the present invention.

The text display system 20 shown in FIG. 2 includes a text display device 100 and a display device 200.

The text display device 100 is an input-output device for displaying a text on the display device 200 and receiving an operation by the operator, and includes, as shown in FIG. 2, a display control section 110, an input section 120, a calculation section 130, and a tactile sensation presentation section 140.

The display device 200 is an image display device such as an LCD or the like.

The display control section 110 is connected to the display device 200 via a communication port (not shown), stores text data containing information of a predetermined feature position, and displays a text on the display device 200 based on the text data. Here, in the first embodiment, the feature position is a position of a line at an end of each predetermined delimiter of a paragraph in the text.

The input section 120 includes a pointing device that has a two dimensional input area and that corresponds to the touchpad 12 shown in FIG. 1. The input section 120 receives an operation by a finger of the operator on the pointing device, and detects the presence or absence of a contact with the finger and a pair of XY-coordinates corresponding to a finger position at which the finger is in contact. The basic configuration and action of the input section 120 are similar to those of a conventional trackpad or touchpad, and detailed descriptions of those are omitted.

The calculation section 130 corresponds to the personal computer body 13 shown in FIG. 1, and includes a display-area calculation section 131, a virtual start/end point calculation section 132, and a presentation calculation section 133.

When a contact by a finger is detected by the input section 120, the display-area calculation section 131 associates the pair of XY-coordinates corresponding to the finger position detected by the input section 120 with the emphasis display position in the text displayed on the display device 200 by the display control section 110. Here, the emphasis display position includes: a position indicating a line that can be subjected to an operation and that is highlighted with a reverse video display, an underline, or the like indicating an active line; a position of a mouse pointer indicating a point that can be subjected to an operation; and the like.

The display-area calculation section 131 detects an operation of moving the finger position while the finger is still in contact, based on a detection result from the input section 120, and calculates a scroll amount of the text displayed on the display device 200 and a movement amount of the emphasis display position in the text, in accordance with variation of the pair of XY-coordinates due to the movement.

The display control section 110 moves the emphasis display position or scrolls the text in accordance with a calculation result from the display-area calculation section 131.

The virtual start/end point calculation section 132 calculates a relative distance between the emphasis display position and the feature position, and determines whether or not a pair of coordinates corresponding to the feature position is within a range in which a tactile sensation is presentable by the tactile sensation presentation section 140 that can form a protrusion or a depression based on the calculated relative distance and the pair of XY-coordinates detected by the input section 120.

Furthermore, when the virtual start/end point calculation section 132 determines that the pair of coordinates corresponding to the feature position is within a range in which a tactile sensation is presentable, the presentation calculation section 133 calculates a pair of coordinate values corresponding to the feature position for the presentation calculation section 133 and a tactile sensation presentation amount that depends on a distance from the emphasis display position to the feature position, based on the relative distance calculated by the virtual start/end point calculation section 132 and the pair of XY-coordinates detected by the input section 120.

The tactile sensation presentation section 140 corresponds to the tactile sensation presentation device 14 shown in FIG. 1, and forms a protrusion or a depression at a position in the input area of the input device indicated by the pair of coordinate values calculated by the calculation section 130.

Here, when it is detected by the input section 120 that the finger of the operator has moved on the input device to the position at which a protrusion or a depression is formed by the tactile sensation presentation section 140, the emphasis display position on the text displayed by the display device 200 moves to the feature position.

When the input section 120 detects that the finger has been removed, the tactile sensation presentation section 140 restores, to the original flat state, the position that has been previously protruded or depressed. In the present embodiment, although the protruded or depressed position is restored to a flat state when the finger has been removed, the position does not necessarily have to be restored to a flat state. Furthermore, the restoring to the flat state may be performed at another timing. For example, without restoring to the flat state when the finger has been removed, a protrusion or a depression may be formed based on a new contact position set by the next contact with the finger.

Figure 3:
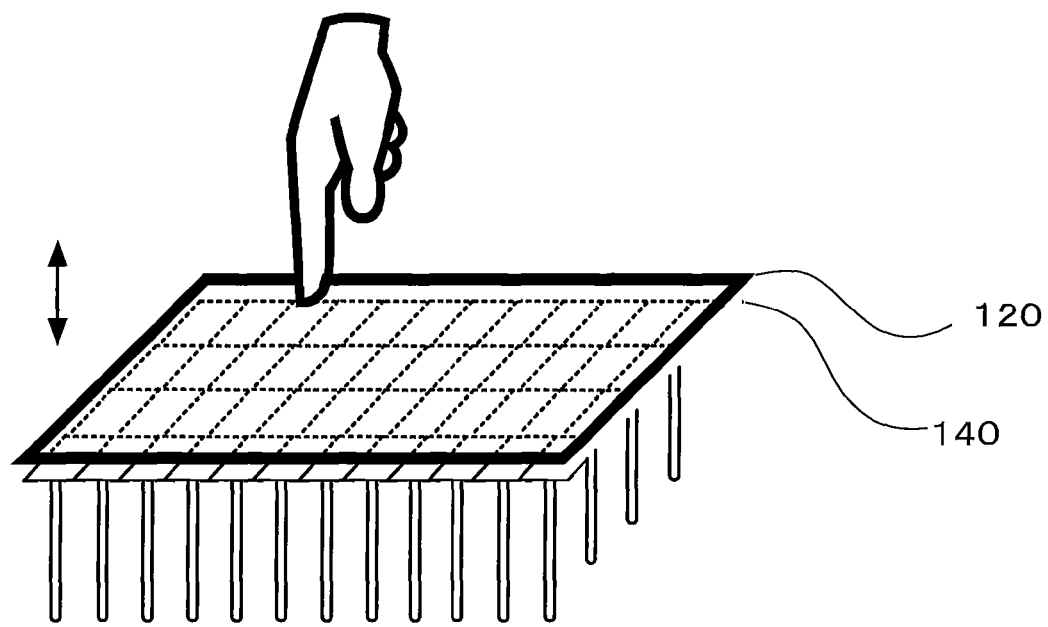
FIG. 3 shows an outline of the structures of an input section 120 and a tactile sensation presentation section 140.

FIG. 3 shows an outline of the structures of the input section 120 and the tactile sensation presentation section 140.

As shown in FIG. 3, the two dimensional input area of the input section 120 is flexible and can be deformed about 5 to 10 mm in a direction perpendicular to the input surface (the vertical direction indicated by the arrow in the figure). The tactile sensation presentation section 140 is disposed on the whole rear surface of the input area of the input section 120, and can be vertically move in multiple stages by arbitrary heights, the surface formed of dots having an arbitrary size. The tactile sensation presentation section 140 provides the operator with a sensuous-presentation mode, by deforming one part of the input area with a combination of a certain shape and height of the dots, and forming a three-dimensional shape in the input area.

Figure 4:
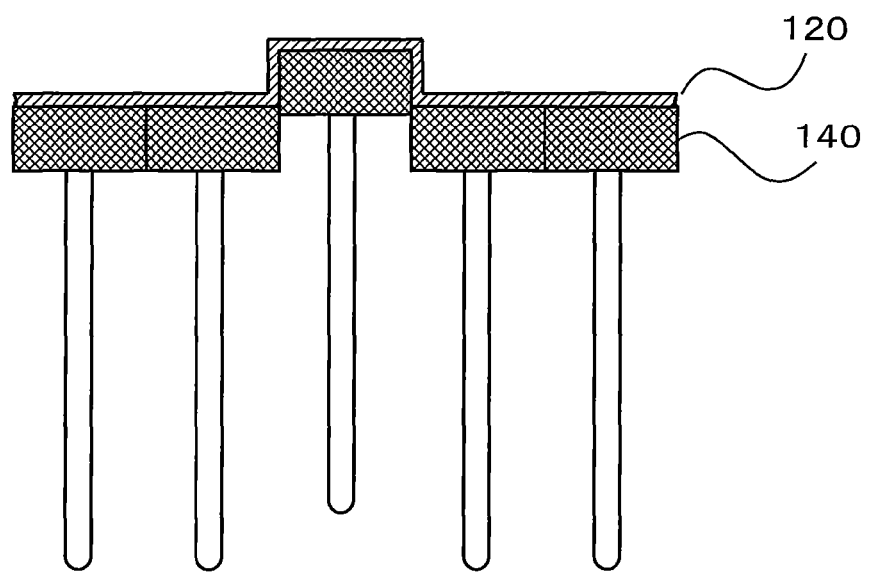
FIG. 4 schematically shows a cross-section of the input section 120 and the tactile sensation presentation section 140 in a state where a three-dimensional shape is formed on the input area for providing an operator with a sensuous-presentation mode.

FIG. 4 schematically shows a cross-section of the input section 120 and the tactile sensation presentation section 140 in a state where a three-dimensional shape is formed on the input area to provide the operator with a sensuous-presentation mode.

As shown in FIG. 4, the input section 120 and the tactile sensation presentation section 140 are integrally formed, and a protrusion or a depression can be formed on one part of the input area by having the input area of the input section 120 deform in accordance with deformation of the tactile sensation presentation section 140.

<General Outline of Actions>

Figure 5:
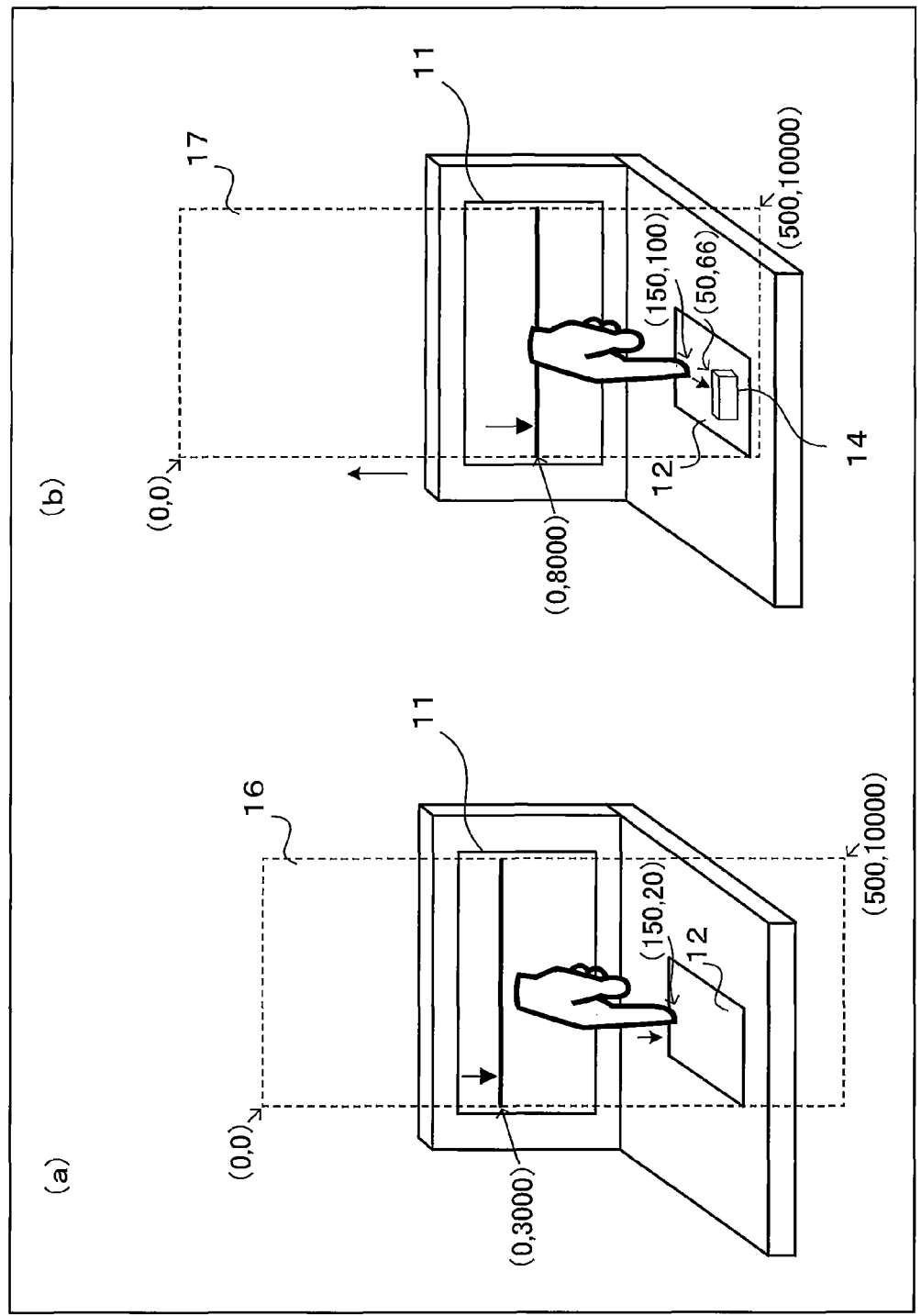
FIG. 5 shows a general outline of an action on the text display system 10.
Figure 6:
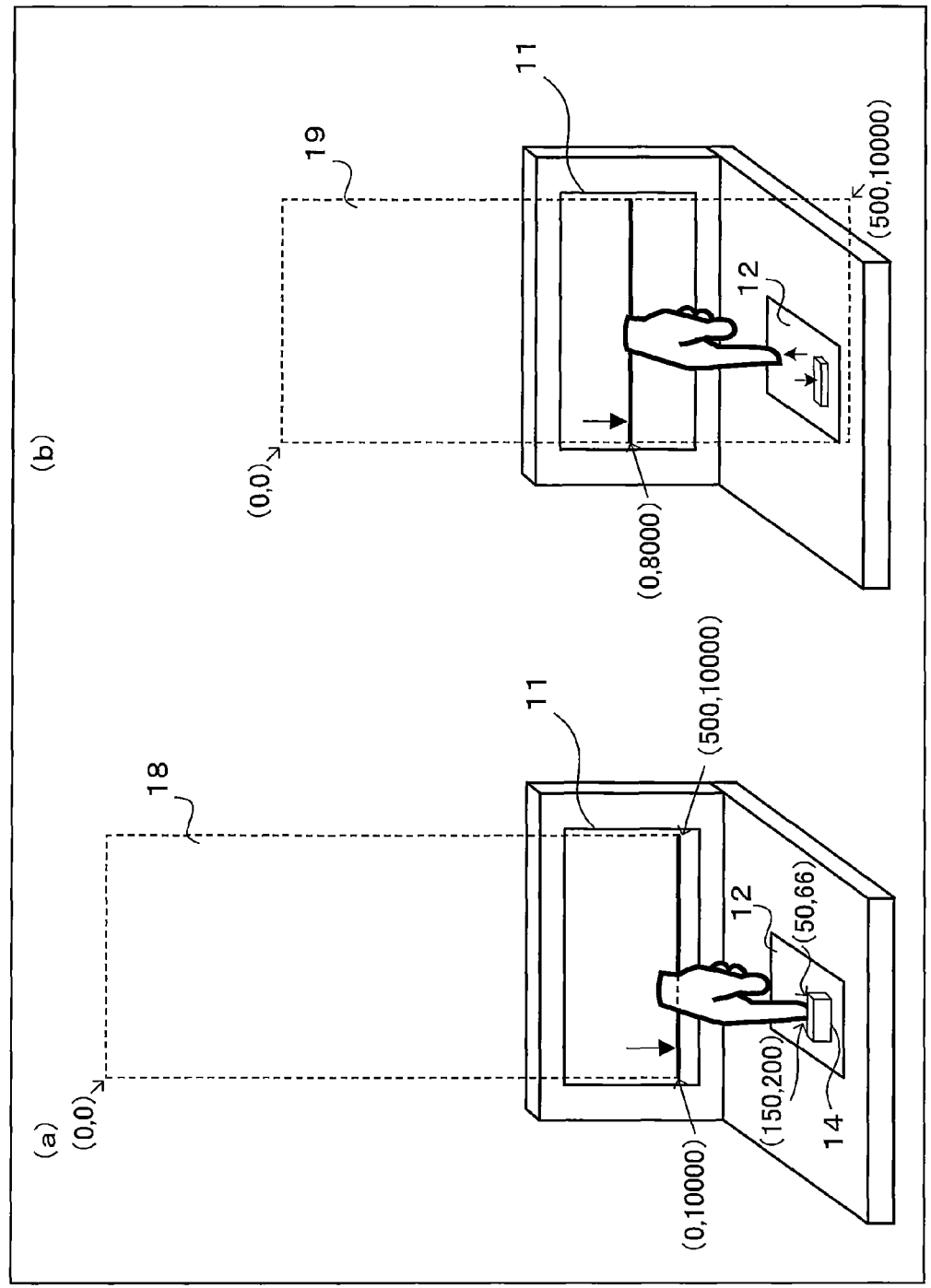
FIG. 6 shows a general outline of an action on the text display system 10.

FIG. 5 and FIG. 6 show a general outline of actions on the text display system 10. Here, similar to FIG. 1, one part of a text is displayed on the monitor 11, and a line indicated by an arrow on the screen of the monitor 11 shows the emphasis display position associated to the finger position. Furthermore, rectangular frames 16 to 19 shown by dotted lines in the figures represent images of a single paragraph in the text displayed on the monitor 11.

In (a) of FIG. 5, when the operator initiates an information inputting operation with the finger by using the touchpad 12, a position of the finger that is in contact with the input area of the touchpad 12 becomes associated to a pair of coordinate values of the emphasis display position on the text. Here, when the finger makes contact with the input area of the touchpad 12, a pair of XY-coordinate values (150, 20) on the touchpad 12 corresponding to the finger position is outputted, and is associated to a pair of coordinate values (0, 3000) of the emphasis display position on the displayed text.

In (b) of FIG. 5, when the user moves the finger in contact with the input area of the touchpad 12 toward a near side, the text displayed on the monitor 11 is scrolled up, and the ending position of the paragraph or the like approaches. At that point, it is determined whether or not a position corresponding to the ending position of the paragraph or the like exists within the input area, and if the existence is determined, the tactile sensation presentation device 14 changes the height of the position in the input area so as to be different from the height of the periphery to form a protrusion or a depression on the input area of the touchpad 12. In this case, when a pair of XY-coordinate values of the finger position on the touchpad 12 is (150, 100), the pair of XY-coordinate values is associated with a pair of coordinate values (0, 8000) of the emphasis display position on the displayed text. Then, a part is protruded in a horizontally long shape in X-direction so as to include a position (50, 66) of the tactile sensation presentation device 14 that corresponds to an ending position (500, 10000) of the paragraph or the like of the displayed text, and thereby the operator is presented with a three-dimensional shape indicating the ending position of the paragraph or the like.

In (a) of FIG. 6, the operator moves the finger in contact with the input area of the touchpad 12 further toward the near side such that the finger touches the protruded or depressed part, which exactly corresponds to the ending position of the paragraph or the like. Then, a line containing the ending position of the paragraph or the like is displayed on the monitor 11, and the line becomes the emphasis display position. In this case, when the protruded part is touched when the finger position is (150, 200), a head position (0, 10000) of the line containing the ending position of the paragraph or the like becomes the emphasis display position. With a tactile sensation, the operator can intuitively recognize reaching the end point of the paragraph.

In (b) of FIG. 6, when the operator removes the finger in contact with the input area of the touchpad 12 in the state in (b) of FIG. 5, the protruded or depressed part returns to an original state.

<Action Steps>

Figure 7:
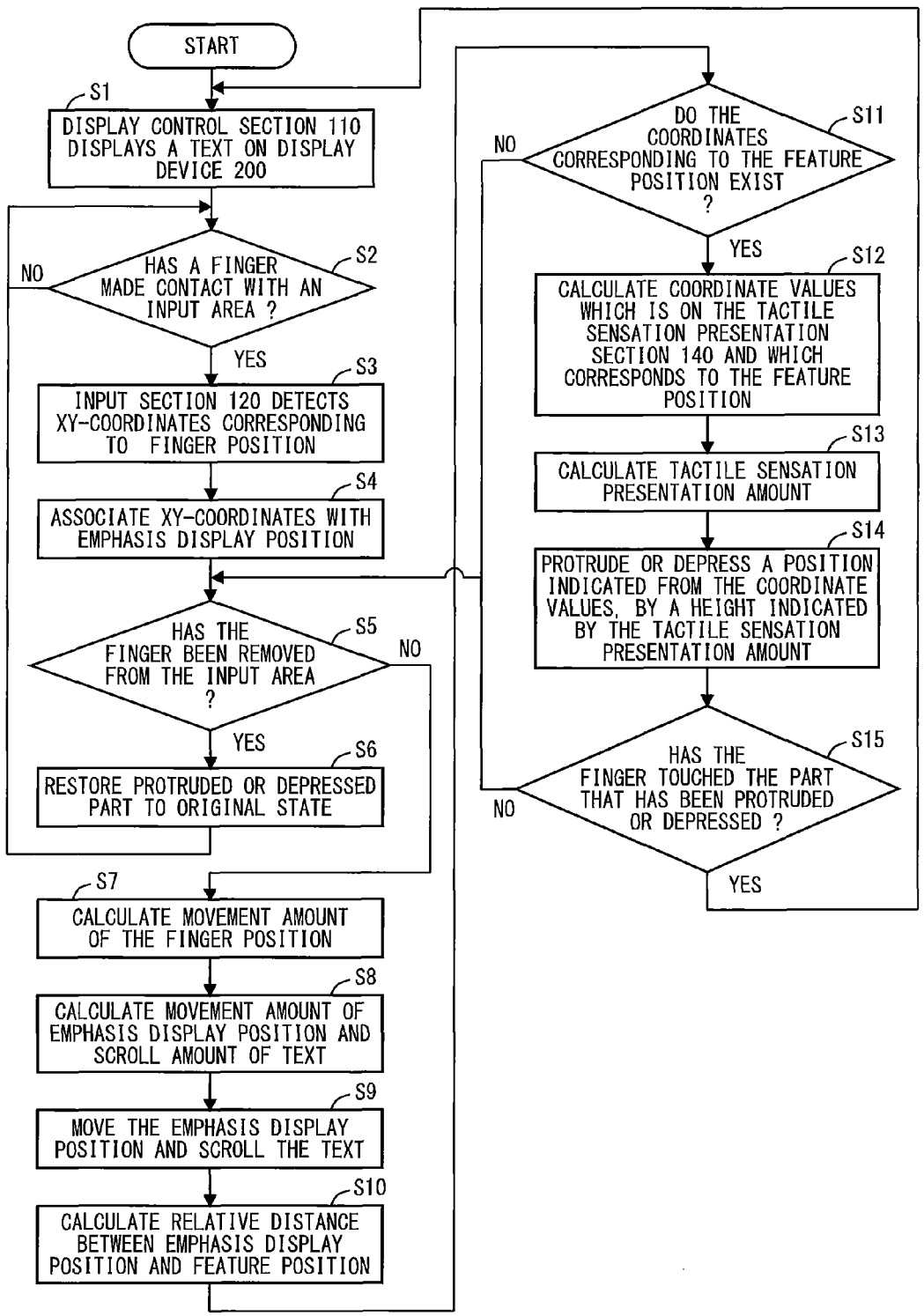
FIG. 7 shows procedural steps of a method for performing a tactile sensation presentation in accordance with a feature position (ending position of a paragraph or the like) in a text in a first embodiment of the present invention.

FIG. 7 shows procedural steps of a method for performing a tactile sensation presentation in accordance with the feature position (the ending position of the paragraph or the like) in the text in the first embodiment of the present invention.

Figure 8:
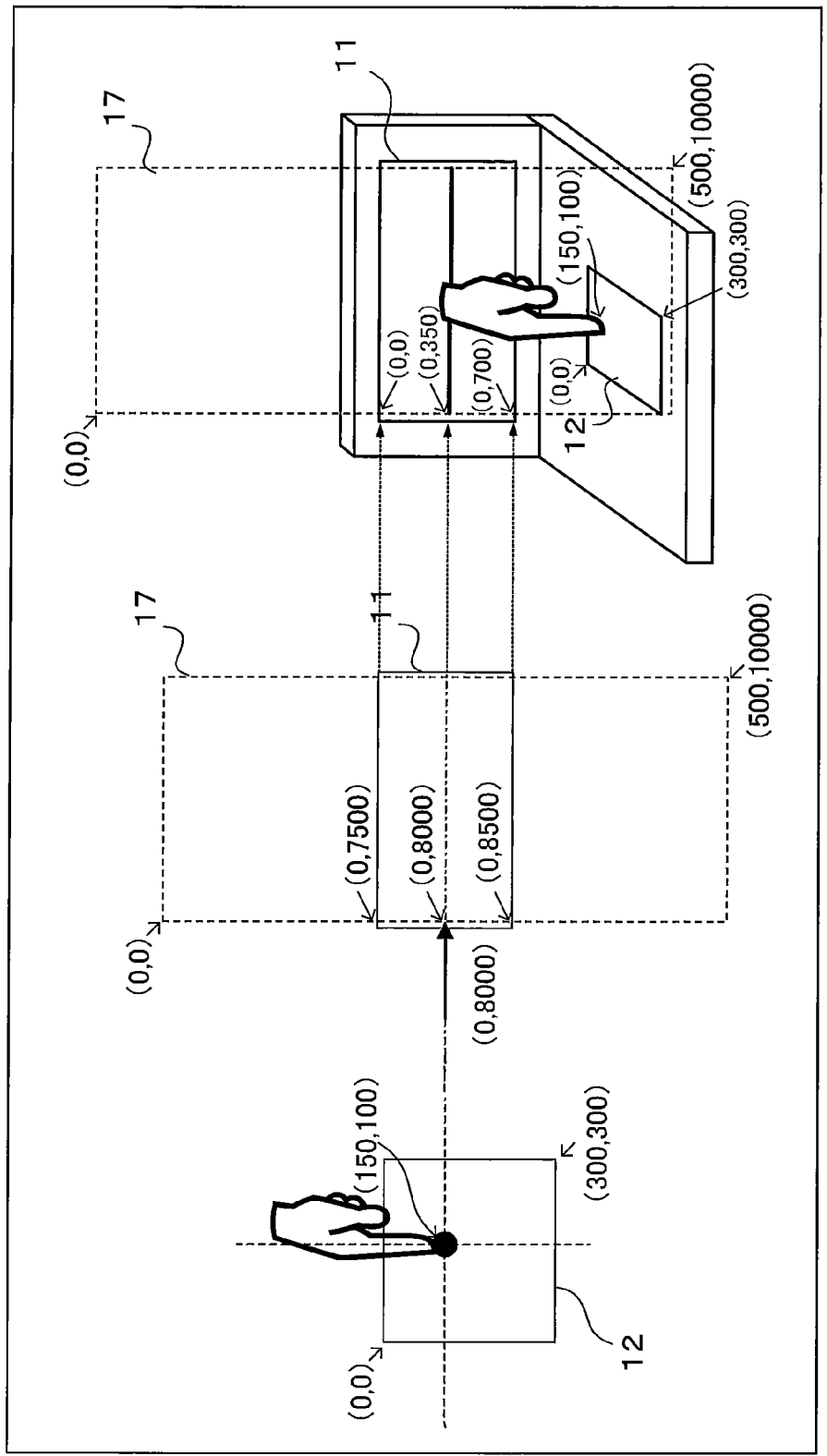
FIG. 8 is for describing a specific example of actions by a display-area calculation section 131.

FIG. 8 is for describing a specific example of actions by the display-area calculation section 131.

(1) The display control section 110 displays the text on the display device 200 (step S1). In FIG. 8, a pair of coordinates of the upper left corner of the text is (0, 0), and a pair of coordinates of the lower right corner of the text is (500, 10000). Furthermore, within the text, an area with coordinates (0, 7500) to (500, 8500) is displayed on the monitor 11 (corresponding to the display device 200).

(2) Waiting continues until the input section 120 detects that a finger has made contact on the input area (step S2). In FIG. 8, with regard to the touchpad 12 (corresponding to the input section 120), a pair of coordinates of the upper left corner is (0, 0), and a pair of coordinates of the lower right corner is (300, 300).

(3) If a contact with the finger is detected (step S2: YES), the input section 120 detects a pair of XY-coordinates corresponding to the finger position (step S3). In FIG. 8, a pair of XY-coordinates of (150, 100) on the touchpad 12 is detected.

(4) The display-area calculation section 131 associates the pair of XY-coordinates corresponding to the finger position detected by the input section 120 with the emphasis display position in the text displayed on the display device 200 (step S4). In FIG. 8, the pair of XY-coordinates corresponding to the finger position is (150, 100) on the touchpad 12. Furthermore, the emphasis display position on the text is a single line that is parallel to the X-axis and that passes through (0, 8000). Furthermore, a pair of coordinates of the emphasis display position on the monitor 11 represents a single line that is parallel to the X-axis and that passes through (0, 350).

(5) It is determined whether or not the input section 120 has detected a removal of the finger from the input area (step S5).

(6) When it is detected that the finger has been removed (step S5: YES), the tactile sensation presentation amount is forcibly set to zero, or the like, and the protruded or depressed part is restored to the original state and the flow returns to step S2 (waiting for a contact with the finger) (step S6).

(7) When it is not detected that the finger has been removed (step S5: NO), the display-area calculation section 131 calculates a movement amount of the finger position that has moved from a touch-in position to a drag position while the finger has been in contact (step S7).

(8) Based on the movement amount of the finger position calculated at step S5, the display-area calculation section 131 calculates a scroll amount of the text displayed on the display device 200 and a movement amount of the emphasis display position in the text (step S8).

(9) The display control section 110 moves the emphasis display position and scrolls the text in accordance with the calculation result from the calculation section 130 (step S9).

Figure 9:
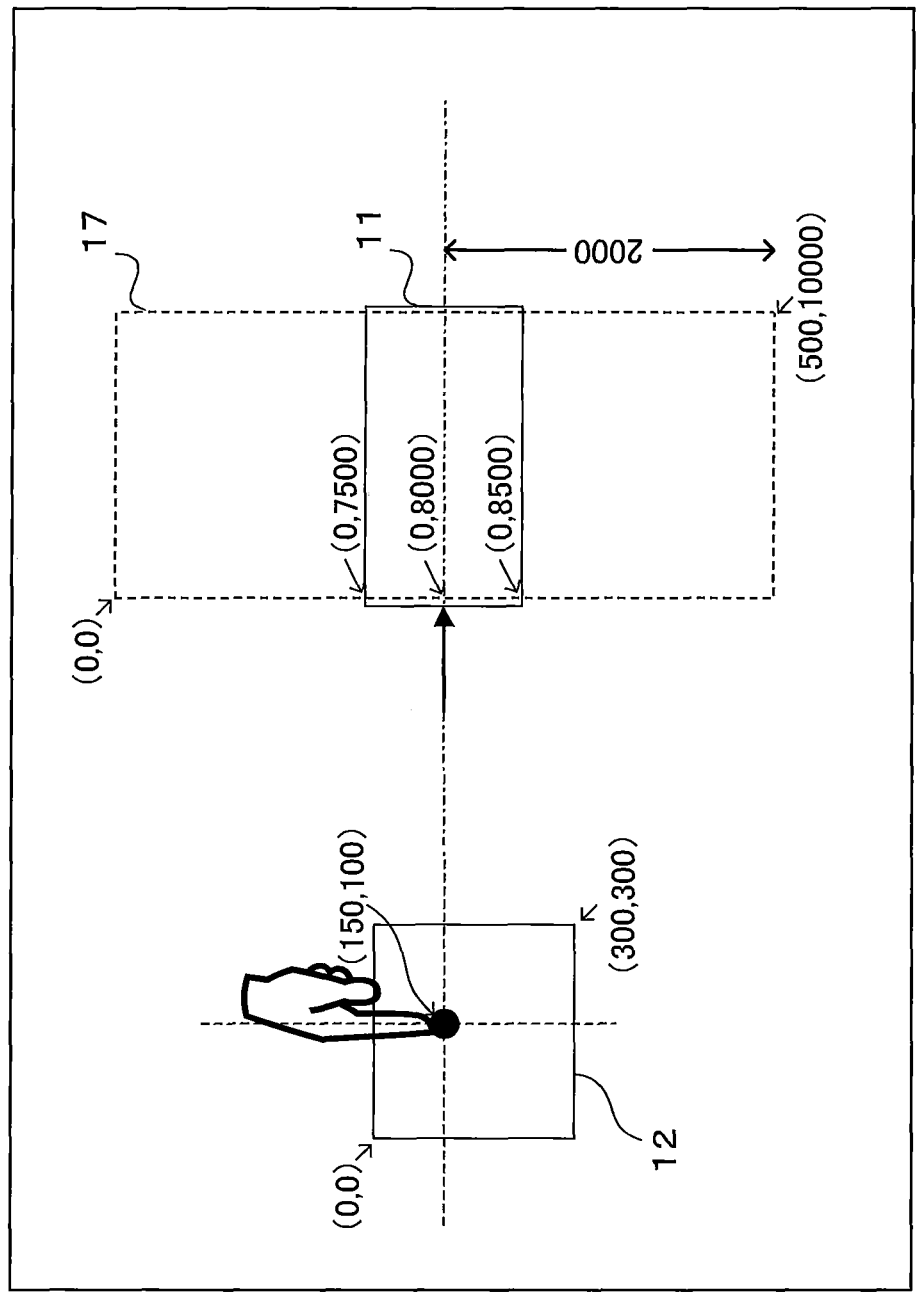
FIG. 9 is for describing a specific example of actions by a virtual start/end point calculation section 132.

FIG. 9 is for describing a specific example of actions by the virtual start/end point calculation section 132.

(10) The virtual start/end point calculation section 132 calculates a relative distance between the feature position and the emphasis display position in the text displayed on the display device 200 (step S10). In FIG. 9, a relative distance of "2000" is calculated as a difference between a Y-coordinate value "8000" of the emphasis display position and a Y-coordinate value of "10000" of the feature position in the text.

(11) The virtual start/end point calculation section 132 determines whether or not a pair of coordinates corresponding to the feature position is within a range in which a tactile sensation is presentable by the tactile sensation presentation section 140 that can form a protrusion or a depression based on the calculated relative distance and the pair of XY-coordinates detected by the input section 120 (step S11). When the pair of coordinates corresponding to the feature position is out of range (step S11: NO), the flow moves to step S5 (determining whether or not a removal of the finger has been detected).

Figure 10:
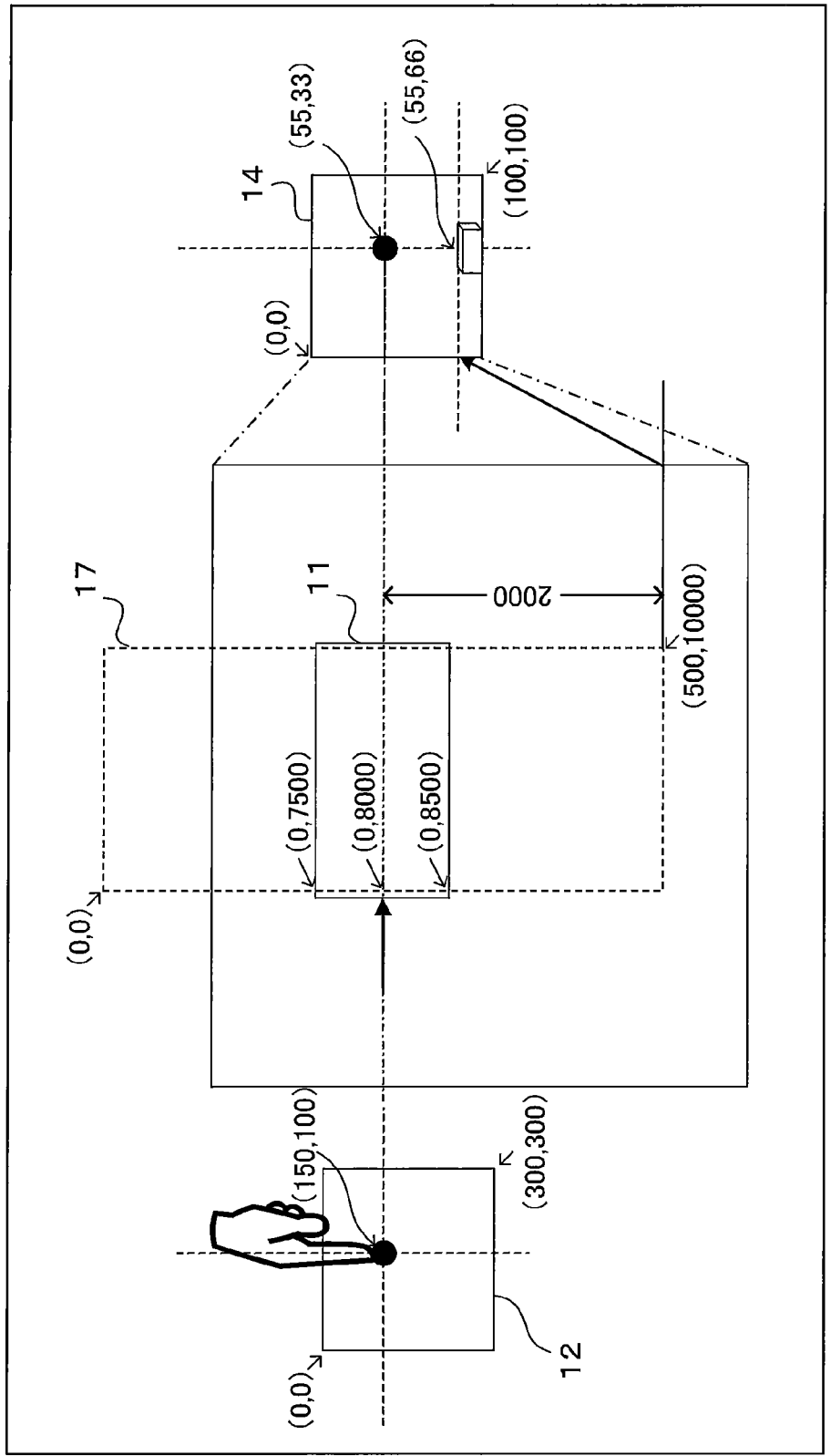
FIG. 10 is for describing a specific example of actions by a presentation calculation section 133.

FIG. 10 is for describing a specific example of actions by the presentation calculation section 133.

(12) When the pair of coordinates corresponding to the feature position is within a range in which a tactile sensation is presentable (step S11: YES), the presentation calculation section 133 calculates a pair of coordinate values corresponding to the feature position on the tactile sensation presentation section 140 (step S12). In FIG. 10, the pair of coordinate values, which is on the tactile sensation presentation device 14 (corresponding to the tactile sensation presentation section 140) and which corresponds to the feature position, is calculated as (50, 66).

(13) The presentation calculation section 133 calculates the tactile sensation presentation amount in accordance with the distance from emphasis display position to the feature position (step S13).

(14) The tactile sensation presentation section 140 protrudes or depresses, by a height indicated by the tactile sensation presentation amount, a position indicated from the pair of coordinate values calculated by the presentation calculation section 133 (step S14). In FIG. 10, protruded is one part on the near side of a boundary created by a straight-line of a single line that is parallel to the X-axis and that passes through the calculated pair of coordinate values (50, 66).

(15) It is determined whether or not the finger has touched the part protruded or depressed at step S14 (step S15). When the finger has not touched the part (step S15: NO), the flow moves to step S5 (determining whether or not a removal of the finger has been detected). When the finger has touched the part (step S15: YES), the flow returns to step S1 (display a new text).

In the present embodiment, an ending position of a text, a paragraph of a text, or the like is described as an example of the feature position that is to be presented by a tactile sensation. However, for example, a feature position such as a starting position of a paragraph or the like, a bookmark position, an index of a dictionary or the like, and the like may be presented as a tactile sensation. Furthermore, a combination of multiple types of feature positions may be simultaneously presented as tactile sensations, such as simultaneously presenting tactile sensations of both a starting position and an ending position of a paragraph or the like. Furthermore, the operator may be allowed to arbitrarily select and set one among the multiple types of feature positions to be presented as a tactile sensation.

Here, a bookmark position indicates to a boundary between a portion previously read by the operator and a portion unread by the operator in the text displayed by the display control section.

Furthermore, when a combination of multiple types of feature positions is simultaneously presented as tactile sensations, modes of the tactile sensation presentations are preferably changed for every type. For example, when simultaneously presenting a starting position and an ending position of a paragraph or the like as tactile sensations, the operator can easily distinguish the two if, when viewed from the finger position, the ending position is presented as a convex facing the near side and the starting position is presented as a convex facing the far side. Furthermore, when simultaneously presenting, for example, a starting position, an ending position, and a bookmark position as tactile sensations, in order to allow the operator to easily distinguish the difference between those, the starting position and the ending position are preferably presented as shapes that are relatively large in height or in length, or as a solid line, and the bookmark position is preferably presented as a shape that is relatively small in height or in length, or as a dotted-line.

<Overview>

As described above, with the configuration of the present embodiment, since a protrusion or a depression can be formed at a position in an input area corresponding to a feature position in a displayed text, an operator can sensuously recognize reaching the feature position by sensing the protrusion or the depression by his/her own finger. Therefore, since the operator can perform the next operation without looking at a display screen of a monitor, a fine advantageous effect of allowing the operator to perform rapid operations can be obtained.

[First Modification]

In the present modification, a bookmark position is used as a feature position that is presented as a tactile sensation.

Figure 11:
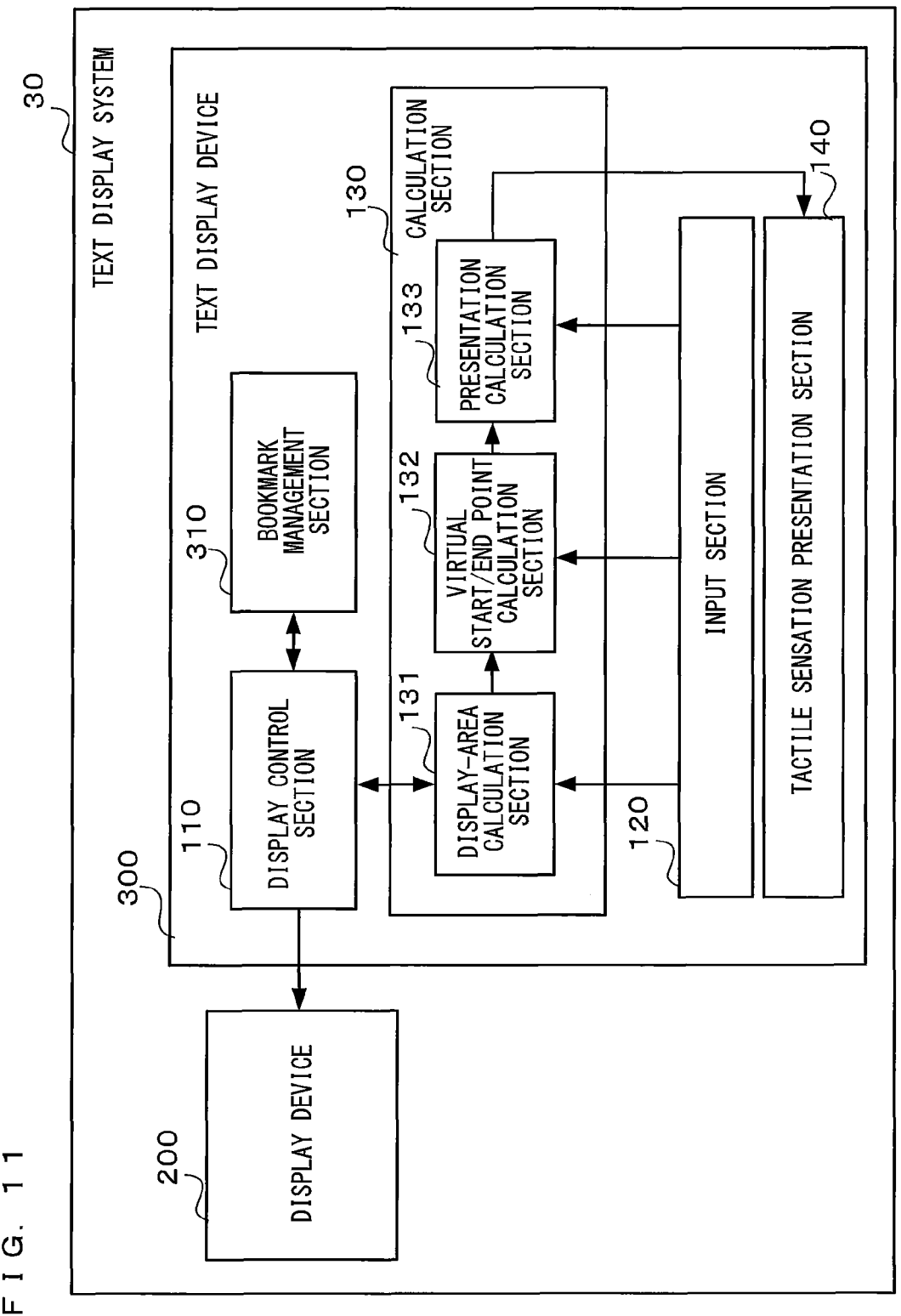
FIG. 11 shows a general outline of a functional configuration of a text display system 30 according to a first modification of the present invention.

FIG. 11 shows a general outline of a functional configuration of a text display system 30 according to a first modification of the present invention.

The text display system 30 shown in FIG. 11 includes a text display device 300 and the display device 200.

The text display device 300 is an input-output device for displaying a text on the display device 200 and receiving an operation by the operator, and includes, as shown in FIG. 11, the display control section 110, the input section 120, the calculation section 130, the tactile sensation presentation section 140, and a bookmark management section 310.

The bookmark management section 310 stores and updates a bookmark position when the operator browses a text to a midpoint of the text, or closes the text, etc.; and outputs the stored bookmark position when the text is opened or when instructed by the operator, and uses the bookmark position as a feature position to be presented as a tactile sensation.

Components other than the bookmark management section 310 and actions of those components are similar to those in the first embodiment.

The above described first modification is highly useful when reading a novel in parts, or when editing a text, etc., since an updated bookmark position is used as a feature position that is presented as a tactile sensation.

[Second Modification]

A second modification is one that presents a dictionary index as a tactile sensation.

The functional configuration of the present modification is similar to that of the first embodiment.

In the present modification, the display control section 110 stores dictionary text data containing information of feature positions such as sizes and mutual positional relationships of a plurality of predetermined heading words, and displays a dictionary index on the display device 200 based on the dictionary text data to allow rapid access of individual words from the index.

Here, the heading words include, for example, the 26 alphabets ("A" to "Z") at the beginning of words for an index of an English-Japanese dictionary, and the 10 syllables ("A," "KA," "SA," "TA," "NA," "HA," "MA," "YA," "RA," and "WA") in the first row of the Japanese 50-syllable table for indices of a Japanese-English dictionary and a Japanese dictionary.

The configuration and action for forming a protrusion or a depression at a feature position are similar to those in the first embodiment.

Figure 12:
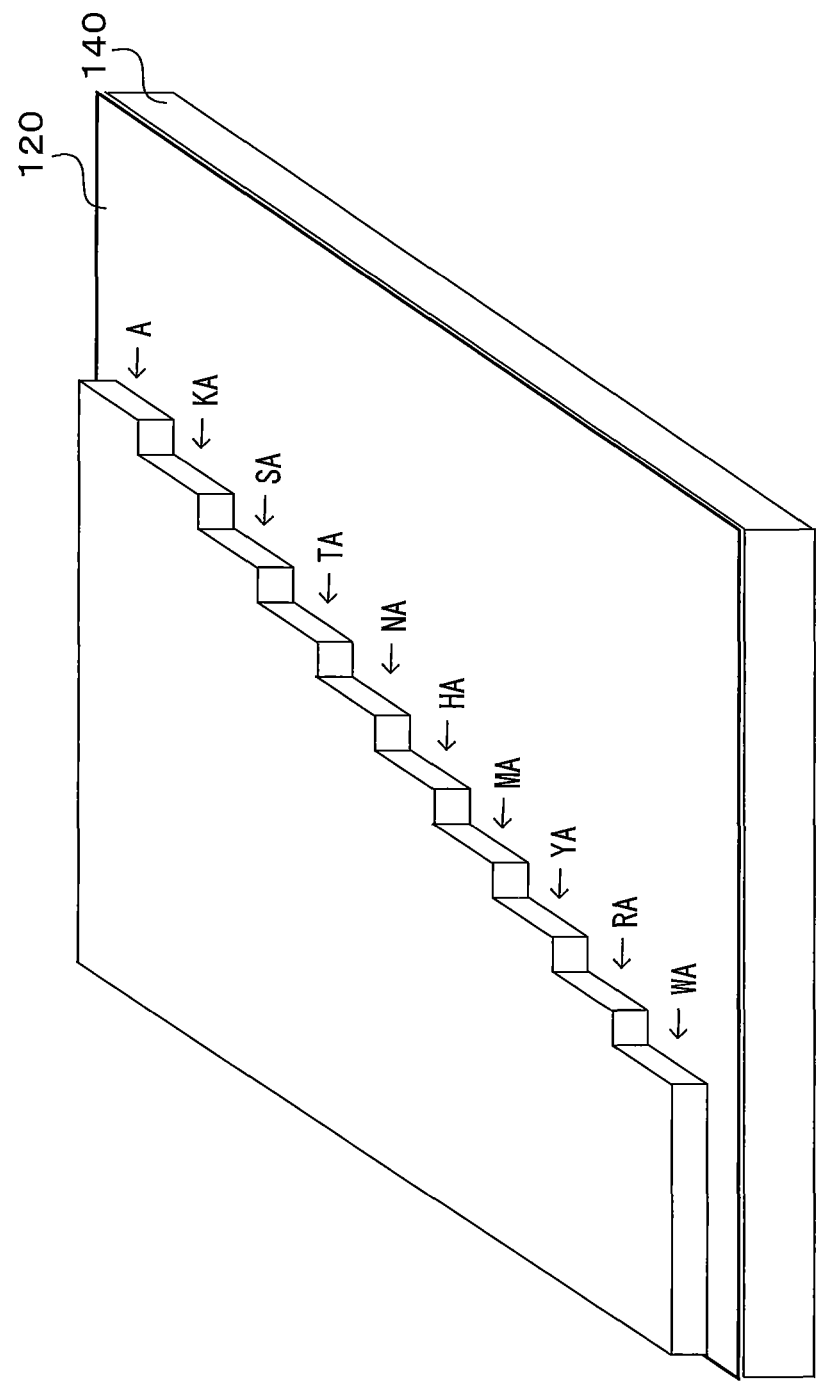
FIG. 12 shows a dictionary index presented as a tactile sensation on a two dimensional input area of the input section 120.
Figure 13:
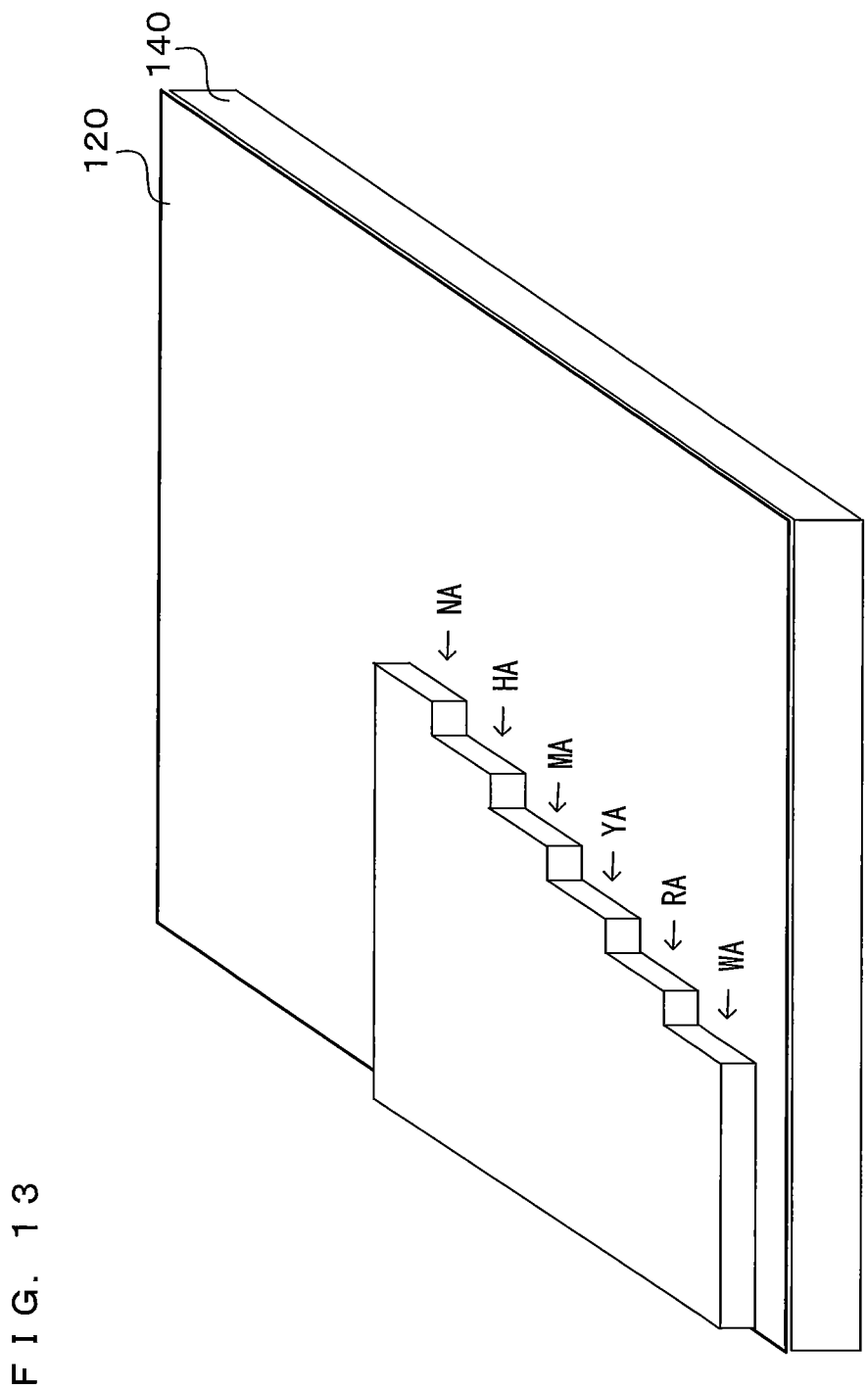
FIG. 13 shows the dictionary index presented as the tactile sensation on the two dimensional input area of the input section 120.

FIG. 12 and FIG. 13 show an example of a dictionary index presented as a tactile sensation on the two dimensional input area of the input section 120.

As shown in FIG. 12, the dictionary index is presented, for example, as a stair-shaped tactile sensation as if being a real dictionary. The number of items displayed at once may be a fixed value, or may be arbitrarily set by the operator.

Here, for example, when the operator touches a protrusion at item "TA" in the index, the item "TA" is recognized, protrusions at the item "TA" and items "A," "KA," and "SA" existing before "TA" are restored to their original state as shown in FIG. 13 as if a dictionary has been opened from the "TA" position, and individual words starting with "TA," the meanings of the words, and the like are displayed on the display device 200.

Figure 14:
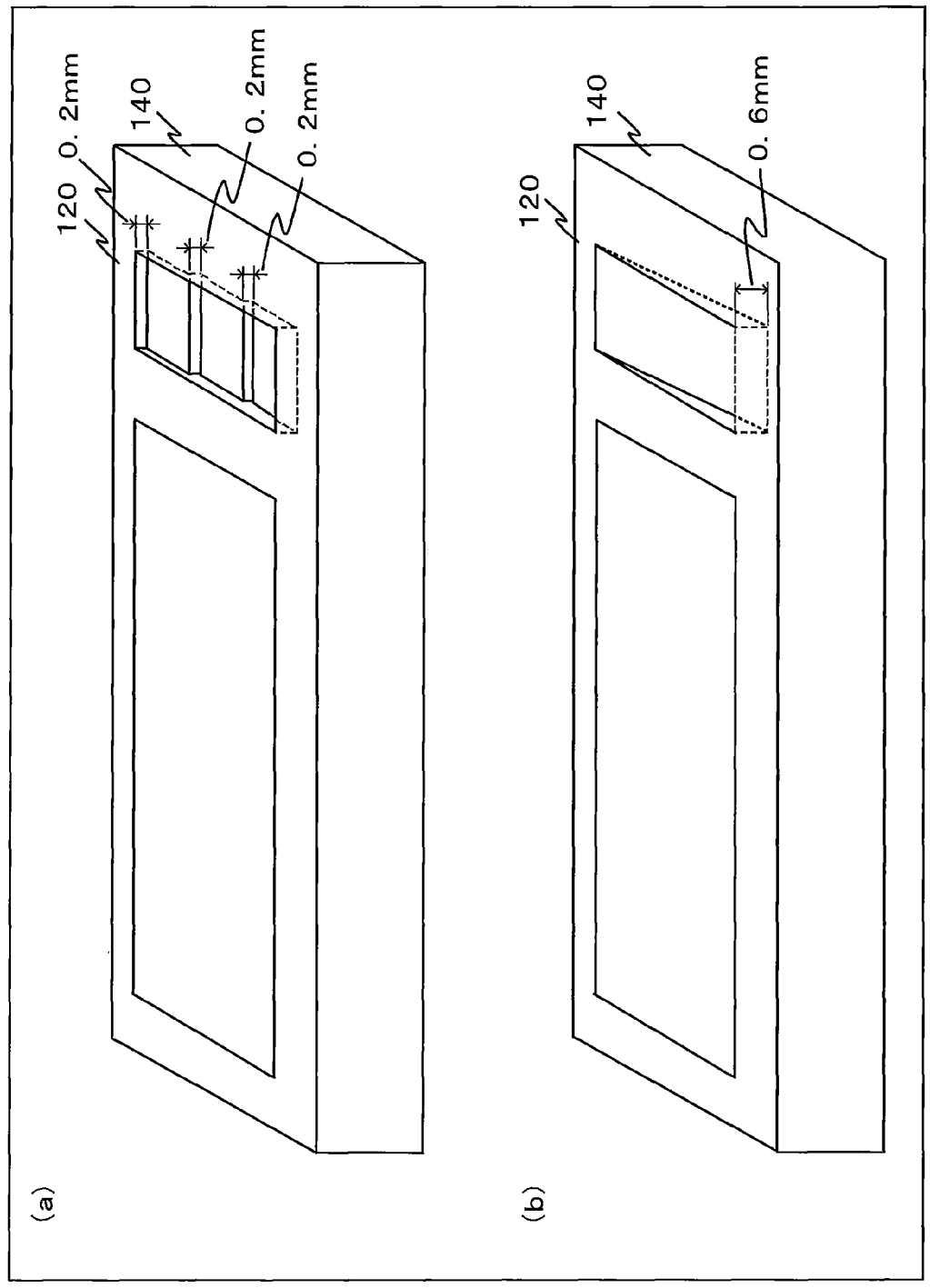
FIG. 14 shows another example of a dictionary index presented as a tactile sensation of the two dimensional input area of the input section 120.

FIG. 14 shows other examples of dictionary indices that are presented as a tactile sensation in the two dimensional input area of the input section 120.

In an example of a dictionary index in (a) of FIG. 14, one part of the input section 120 is depressed in three stages by −0.2 mm per stage.

In an example of a dictionary index in (b) of FIG. 14, one part of the input section 120 is depressed by 0 to −0.6 mm in a gentle slope.

With the above described second modification, since indices that have concavities and convexities and that exist in a real dictionary can be present, the second modification has an excellent advantageous effect that allows providing the operator with a sense of searching for heading words through touch, and allows rapid operation for the operator.

[Third Modification]

A third modification includes a plurality of items that can be presented as tactile sensations, and allows the operator to set whether or not an item is to be presented as a tactile sensation item by item.

Here, the items that can be selected so as to be presented as tactile sensations include, for example, a starting position and an ending position of a paragraph, a bookmark position, and an index. When an index is selected so as to be presented as a tactile sensation, settings for the number of heading words that is to be presented as tactile sensations at once can be configured.

FIG. 15 shows a general outline of a functional configuration of a text display system 40 according to the third modification of the present invention.

The text display system 40 shown in FIG. 15, includes a text display device 400 and the display device 200.

The text display device 400 is an input-output device for displaying a text on the display device 200 and receiving an operation by the operator, and includes, as shown in FIG. 15, the display control section 110, the input section 120, the calculation section 130, the tactile sensation presentation section 140, and an item setting section 410.

When the operator gives an instruction to select a settings screen by clicking an icon or the like, the item setting section 410 displays the settings screen on the display device 200 and receives, from the operator, a selection of items that are to be presented as tactile sensations.

FIG. 16 shows the settings screen displayed on the display device 200.

As shown in FIG. 16, check boxes are provided for each item, and the operator can selectively place a check mark in a check box for an item that is to be presented as a tactile sensation. In addition, when a check mark is placed in a check box for index, the maximum number of heading words that is to be presented as tactile sensations at once can be configured. Here, the operator can select whether or not to present, as a tactile sensation, "starting position of a text," "ending position of a text," "starting position of a paragraph," "ending position of a paragraph," "bookmark position," and "dictionary index." In addition, settings can be made for each item with regard to: whether to form a protrusion, whether to form a depression, whether to use a solid line, whether to use a dotted line, and the height (depth) of presentation.

It should be noted that settings other than the settings described above may be configured. For example, the shape of a protrusion or a depression may be configured for each item.

Specific examples of the shapes of protrusions and depressions are shown in the following.

FIG. 17 shows a manner in which a tactile sensation is presented when a finger is moved in the lateral direction for horizontally scrolling a screen.

A tactile sensation presentation with a longwise protrusion as shown in FIG. 17 is highly useful for, for example, book data including many vertical writings that require horizontal scrolling.

Figure 18:
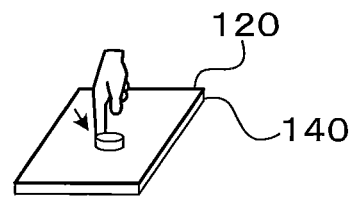
FIG. 18 shows a manner in which a tactile sensation is presented by having a circular area protruded.

FIG. 18 shows a manner in which a tactile sensation is presented by protruding a circular area.

For example, when representing an object or a destination on a map, a round shape without any projections is preferred, since a finger will make contact on the shape from all directions. Thus, a tactile sensation presentation with a cylindrical-shaped protrusion as shown in FIG. 18 is highly useful.

Figure 19:
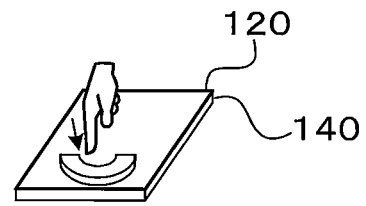
FIG. 19 shows a manner in which a tactile sensation is presented by protruding an area that has a U-shape whose opening is facing the far side and that resembles a doughnut-shaped mold that has been cut in half.

FIG. 19 shows a manner in which a tactile sensation is presented by protruding an area that has a U-shape whose opening is facing the far side and that resembles a doughnut-shaped mold that has been cut in half.

For example, by having a protrusion whose shape catches, at a center thereof, an operation by the finger moving from the far side toward the near side as shown in FIG. 19, deviations in the left-right direction are corrected every time the protruding portion is touched even if the operator performs the operation without looking at the input area at all, and thereby rapid operations can be easily performed continuously.

The above described third modification is highly useful, since the operator can customize and use the tactile sensation presentation function so as to match the operator's preference and intention.

[Fourth Modification]

In the first embodiment, one part of the input area of the pointing device is actually protruded or depressed such that a specific position in the displayed text is sensuously presented to the operator by providing the operator with a tactile sensation of a protrusion or a depression at the specific position in the displayed text. On the other hand, in a fourth modification, one part or all of the input area of the pointing device is vibrated to form a simulated protrusion or depression such that a specific position in the displayed text is sensuously presented to the operator by providing the operator with a tactile sensation of a protrusion or a depression at the specific position in the displayed text.

Figure 20:
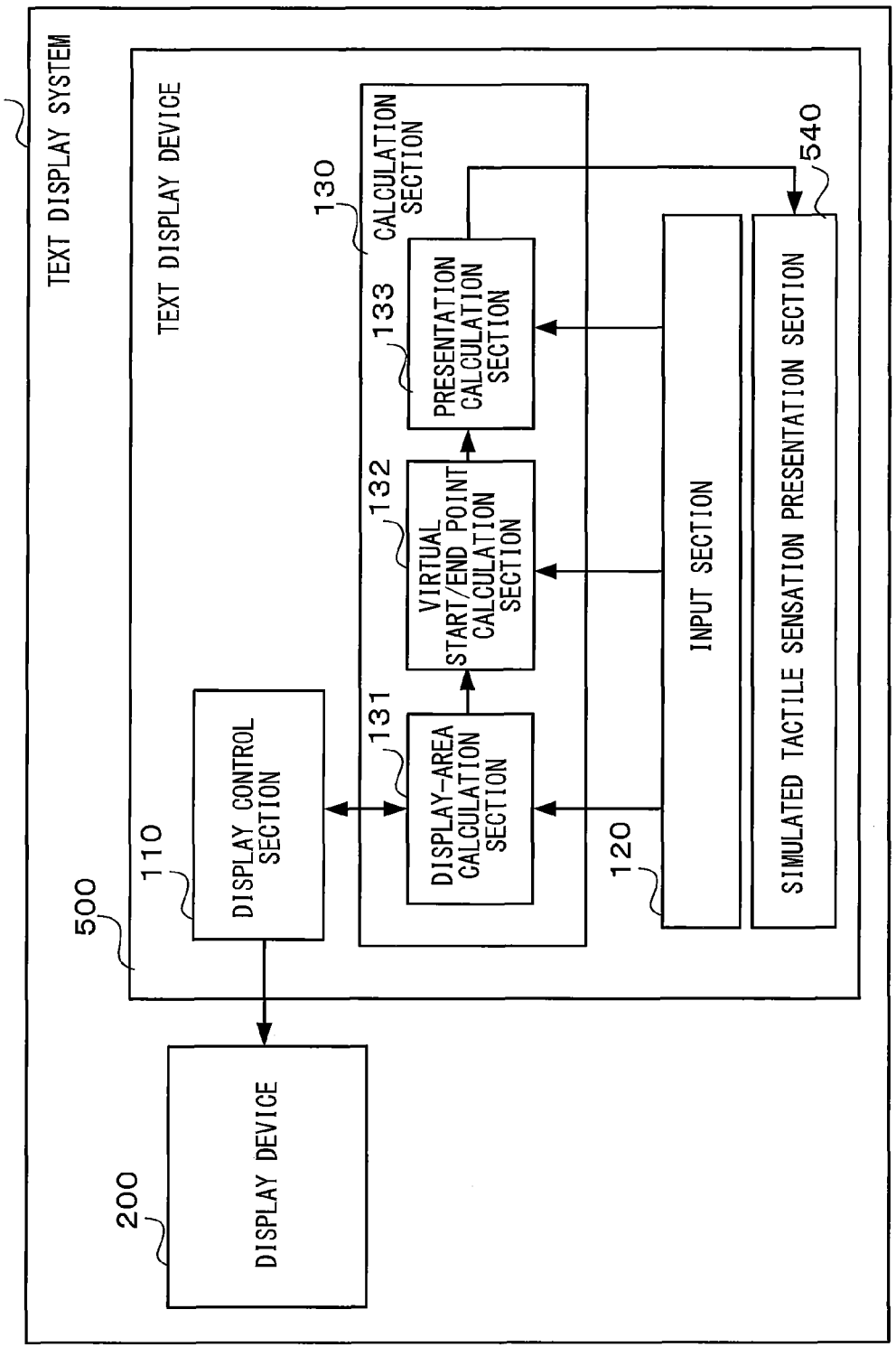
FIG. 20 shows a general outline of a functional configuration of a text display system 50 according to a fourth modification of the present invention.

FIG. 20 shows a general outline of a functional configuration of a text display system 50 according to the fourth modification of the present invention.

The text display system 50 shown in FIG. 20 includes a text display device 500 and the display device 200. Components similar to those in 20 of the first embodiment shown in FIG. 2 are given identical reference characters and descriptions of those are omitted.

The text display device 500 is an input-output device for displaying a text on the display device 200 and receiving an operation by the operator, and includes, as shown in FIG. 20, the display control section 110, the input section 120, the calculation section 130, and a simulated tactile sensation presentation section 540.

The simulated tactile sensation presentation section 540 provides a vibration as appropriate at a specific frequency to one part or all of the two dimensional input area of the input section 120, and forms a simulated protrusion or depression at the position which is in the input area of the input device and which is indicated by the pair of coordinate values calculated by the calculation section 130.

The principle and method for causing a simulated protrusion or depression using vibration are described in, for example, a research paper (Vibratory Tactile Display of Image-Based Textures Yasushi Ikei, Kazufumi Wakamatsu, and Shuichi Fukuda: Tokyo Metropolitan Institute of Technology: 0272-1716/97/$10.00 © 1997 IEEE: IEEE Computer Graphics and Applications: Authorized licensed use limited to: Panasonic Corporation. Downloaded on Dec. 22, 2009 at 03:05 from IEEE Xplore. Restrictions apply.) showing that a user can recognize a texture pattern from a tactile sensation caused by vibration even without any changes to the shape of a tactile sensation presentation device. Therefore, the present modification can be realized by applying a conventional technology disclosed by this research paper or the like.

When detailed coordinate values cannot be precisely represented by the simulate protrusion or depression caused by vibration, a display position may be changed as appropriate for such detailed portion, or the position may be adjusted by changing, as appropriate, a ratio between an amount of movement by the input device and the scale of the input area of the input device.

With the above described fourth modification, a tactile sensation can be presented by forming a simulated protrusion or depression using vibration at a position in the input area corresponding to the feature position of the displayed text. Therefore, the operator can sensuously recognize reaching the feature position by sensing the simulate protrusion or depression by his/her own finger.

It should be noted that the modifications may be combined as appropriate, as long as there are no contradictions.

The above described embodiments can also be realized by causing a CPU to execute a program that can cause the CPU to execute the above described procedural steps stored in a storage device (ROM, RAM, hard disk, or the like). In such a case, the program may be stored in the storage device from a storage medium and then executed, or may be directly executed from the storage medium. As described herein, the storage medium refers to storage media including semiconductor memories such as ROM, RAM, flash memory, and the like, magnetic disc memories such as a flexible disk, a hard disk, and the like, optical discs such as CD-ROM, DVD, BD, and the like, and memory cards and the like. Furthermore, the storage medium is a concept that also includes communication media such as a telephone line, a transmission line, and the like.

A communication system including the invention of the present application may take a form of an adapter that converts a signal interface such as Ethernet (registered trademark) interface, IEEE 1394 interface, or USB interface into an interface for power line communications, and thereby the communication system can connect to multimedia apparatuses, such as a personal computer, a DVD recorder, a digital television, and a home server system, which have various interfaces. This allows construction of a network system that uses the power line as a medium and that is capable of high-speed transmission of digital data such as multimedia data and the like. As a result, unlike a conventional wired LAN, there is no need for laying out a new network cable, and power lines that are already install in homes, offices, and the like can be used as network lines without any modifications. Therefore, the present invention is highly useful in terms of the cost aspect and ease of installation.

Furthermore, in the future, if functions including that of the present invention are built into multimedia apparatuses such as a personal computer, a DVD recorder, a digital television, a home server system, and the like, data transmission between apparatuses becomes possible through power cords of the multimedia apparatuses. In such a case, an adapter, an Ethernet cable, an IEEE1394 cable, a USB cable, and the like become unnecessary, and wiring becomes simplified. Furthermore, since these apparatuses can connect to the Internet via a router, and connect to a wireless LAN or a conventional wired LAN with a use of a hub or the like, there will be no problems regarding the expansion of a LAN system using a high-speed power line transmission system that includes the present invention.

In addition, the power line transmission method does not have the problem of leaked data due to interception of radio waves as in the case with a wireless LAN, since data communication flows through a power line. Therefore, the power line transmission method has an advantageous effect also in terms of data protection for ensuring security. Of course, data transferred in a power line is protected by, for example, IPsec in IP, encryption of the contents itself, other DRM (Digital Rights Management) schemes, and the like.

As described above, it is possible to transmit high-quality AV contents using the power line, by installing QoS (Quality of Service) functions that includes copyright protection function through contents encryption, and the advantageous effects of the present invention (throughput enhancement, bandwidth allocation that flexibly responds to increase in retransmission and traffic fluctuation).

While the present invention has been described in detail, the foregoing description is in all aspects illustrative and not restrictive. It will be understood that numerous other modifications and variations can be devised without departing from the scope of the invention.

INDUSTRIAL APPLICABILITY

The text display device, the text display program, and the text display method of the present invention is applicable for displaying, browsing, and the like of all types of text. Since the present invention allows sensuous and rapid operations, the present invention is highly useful for all personal computers for business use and private use.

DESCRIPTION OF THE REFERENCE CHARACTERS 10 text display system
11 monitor
12 touchpad
13 personal computer body
14 tactile sensation presentation device
20 text display system
30 text display system
40 text display system
50 text display system
100 text display device
110 display control section
120 input section
130 calculation section
131 display-area calculation section
132 virtual start/end point calculation section
133 presentation calculation section
140 tactile sensation presentation section
200 display device
300 text display device
310 bookmark setting section
400 text display device
410 item setting section
500 text display device
540 simulated tactile sensation presentation section

The invention claimed is:

1. A text display device for displaying a text on a display device and receiving an operation performed by an operator, the text display device comprising:
   a display control section configured to display, on the display device, a text containing a feature position preset in the text display device;
   an input section including an input device having a two dimensional input area to receive an operation performed by a finger of the operator, the input section being to detect a presence of a contact of the finger with the two dimensional input area of the input device, and being configured to detect a first pair of XY-coordinates of a finger position at which the finger is in contact with the two dimensional input area;

a calculation section configured to, when a contact of the finger is detected by the input section, (i) associate the first pair of XY-coordinates detected by the input section with an emphasis display position that is highlighted in the text displayed on the display device, (ii) calculate a relative distance in the text between the emphasis display position and the feature position, (iii) calculate, based on the relative distance and the first pair of XY-coordinates, a second pair of coordinates representing a position in the two dimensional input area, corresponding to the feature position in the text, and (iv) calculating a tactile sensation presentation amount corresponding to the relative distance; and a tactile sensation presentation section disposed on a side, opposing a surface on which the finger is in contact, of the input device, the tactile sensation presentation section being formed with a plurality of dots and being configured to move in multiple stages by arbitrary heights, wherein the tactile sensation presentation section forms, upon calculation of the tactile sensation presentation amount by the calculation section, a protrusion or depression formed by a combination of a shape of the dots associated with the feature position and a height represented by the tactile sensation presentation amount, at the position of the second pair of XY-coordinates in the input device.

2. The text display device according to claim 1, wherein:
the calculation section detects an operation of moving the finger position while the finger is still in contact with the input device, based on a detection result from the input section, and calculates a movement amount of the emphasis display position in the displayed text displayed on the display device in accordance with a variation of the first pair of XY-coordinates due to the moving of the finger position; and the display control section moves the emphasis display position in accordance with a calculation result from the calculation section, and, when the input section detects that the first pair of XY-coordinates coincides with the second pair of XY-coordinates due to the movement of the first pair of XY-coordinates, moves the emphasis display position to the feature position.

3. The text display device according to claim 1, wherein when the input section detects that the finger has been removed, the tactile sensation presentation section further restores, to an original state, the protrusion or the depression formed at the second pair of XY-coordinates in the input device.

4. The text display device according to claim 1, wherein:
an ending position of the text displayed by the display device or an ending position of a paragraph in the text is set as the feature position in the text display device;
the calculation section calculates a Y-coordinate corresponding to the ending position in the two dimensional input area; and
the tactile sensation presentation section forms, at the position of the Y-coordinate in the input device, the protrusion or the depression extending in an X-axis direction in the two dimensional input area.

5. The text display device according to claim 1, wherein:
a starting position and an ending position of the text displayed by the display device or of each paragraph in the text are set as the feature position in the text display device;

the calculation section calculates respective Y-coordinates corresponding to the starting position and the ending position in the two dimensional input area; and
the tactile sensation presentation section forms, at the position of each Y-coordinate in the input device, the protrusion or the depression extending in an X-axis direction in the two dimensional input area.

6. The text display device according to claim 1, further comprising a bookmark management section configured to store and change a bookmark position indicating a boundary between a portion previously read by the operator and a portion unread by the operator in the text displayed by the display device, wherein:
the bookmark position is set as the feature position in the text display device;
the calculation section calculates a Y-coordinate corresponding to the bookmark position in the two dimensional input area; and
the tactile sensation presentation section forms, at the position of the Y-coordinate in the input device, the protrusion or the depression extending in an X-axis direction in the two dimensional input area.

7. The text display device according to claim 1, wherein:
the display control section displays, on the display device, a dictionary containing, as the feature position, predetermined multiple heading positions preset in the text display device;
the calculation section calculates multiple pairs of XY-coordinates corresponding to the respective multiple heading positions in the two dimensional input area; and
the tactile sensation presentation section forms protrusions or depressions at respective positions and peripheries of the multiple pairs of XY-coordinates in the input device.

8. The text display device according to claim 7, wherein the tactile sensation presentation section creates a stair-shaped dictionary index by forming protrusions or depressions in the two dimensional input area based on the multiple pairs of XY-coordinates calculated by the calculation section.

9. The text display device according to claim 8, further comprising a setting section configured to allow the operator to arbitrarily set a number of stairs for creating the stair-shaped dictionary index by the tactile sensation presentation section.

10. The text display device according to claim 1, wherein the display device is a display monitor and the input device is a track pad.

11. The text display device according to claim 10, wherein the display monitor is a Liquid Crystal Display (LCD) monitor.

12. A non-transitory computer-readable recording medium storing a text display program executed in a text display device for displaying a text on a display device and receiving an operation performed by an operator, the text display program causing the text display device to execute:
a display control step of displaying, on the display device, a text containing a feature position preset in the text display device;
an input step of receiving an operation performed by a finger of the operator on an input device having a two dimensional input area, detecting a presence of a contact of the finger with the two dimensional input area of the input device, and detecting a first pair of XY-coordinates of a finger position at which the finger is in contact with the two dimensional input area;
a calculation step of, when a contact of the finger is detected at the input step, (i) associating the first pair of XY-coordinates detected at the input step with an emphasis display position that is highlighted in the text displayed at the display control step, (ii) calculating a relative distance in the text between the emphasis display position and the feature position, (iii) calculating, based on the relative distance and the first pair of XY-coordinates, a second pair of XY-coordinates representing a position in the two dimensional input area, corresponding to the feature position in the text, and (iv) calculating a tactile sensation presentation amount corresponding to the relative distance; and a tactile sensation presentation step of, by using a tactile sensation presentation section which is disposed on a side, opposing a surface on which the finger is in contact, of the input device, and which tactile sensation presentation section is formed with a plurality of dots and configured to move in multiple stages by arbitrary heights, forming, upon calculation of the tactile sensation presentation amount by the calculation section, a protrusion or a depression formed by a combination of a shape of the dots associated with the feature position and a height represented by the tactile sensation presentation amount, at the position of the second pair of XY-coordinates in the input device.

13. A text display method for displaying a text on a display device and receiving an operation performed by an operator, the method comprising:

a display control step of displaying, on the display device, a text containing a feature position preset in the text display device;

an input step of receiving an operation performed by a finger of the operator on an input device having a two dimensional input area, detecting a presence of a contact of the finger with the two dimensional input area of the input device, and detecting a first pair of XY-coordinates of a finger position at which the finger is in contact with the two dimensional input area;

a calculation step of, when a contact of the finger is detected at the input step, (i) associating the first pair of XY-coordinates detected at the input step with an emphasis display position that is highlighted in the text displayed at the display control step, (ii) calculating a relative distance in the text between the emphasis display position and the feature position, (iii) calculating, based on the relative distance and the first pair of XY-coordinates, a second pair of XY-coordinates representing a position in the two dimensional input area, corresponding to the feature position in the text, and (iv) calculating a tactile sensation presentation amount corresponding to the relative distance; and a tactile sensation presentation step of, by using a tactile sensation presentation section which is disposed on a side, opposing a surface on which the finger is in contact, of the input device, and which tactile sensation presentation section is formed with a plurality of dots and configured to move in multiple stages by arbitrary heights, forming, upon calculation of the tactile sensation presentation amount by the calculation section, a protrusion or a depression formed by a combination of a shape of the dots associated with the feature position and a height represented by the tactile sensation presentation amount, at the position of the second pair of XY-coordinates in the input device.

* * * * *